United States Patent
Ono et al.

(10) Patent No.: US 8,459,802 B2
(45) Date of Patent: Jun. 11, 2013

(54) HIGH-PRESSURE DISCHARGE LAMP LIGHTING DEVICE WITH CURRENT CONTROL, HIGH-PRESSURE DISCHARGE LAMP DEVICE USING SAME, PROJECTOR USING SAID HIGH-PRESSURE DISCHARGE LAMP DEVICE, AND HIGH-PRESSURE DISCHARGE LAMP LIGHTING METHOD WITH CURRENT CONTROL

(75) Inventors: Syunsuke Ono, Osaka (JP); Go Yamada, Osaka (JP); Masahiro Yamamoto, Osaka (JP); Minoru Ozasa, Kyoto (JP)

(73) Assignee: Panasonic Corporation, Osaka (JP)

( * ) Notice: Subject to any disclaimer, the term of this patent is extended or adjusted under 35 U.S.C. 154(b) by 362 days.

(21) Appl. No.: 12/935,938

(22) PCT Filed: Mar. 25, 2009

(86) PCT No.: PCT/JP2009/001314
§ 371 (c)(1),
(2), (4) Date: Oct. 1, 2010

(87) PCT Pub. No.: WO2009/122678
PCT Pub. Date: Oct. 8, 2009

(65) Prior Publication Data
US 2011/0025989 A1 Feb. 3, 2011

(30) Foreign Application Priority Data
Apr. 1, 2008 (JP) ................................. 2008-094690

(51) Int. Cl.
*G03B 21/20* (2006.01)
*H05B 41/36* (2006.01)
(52) U.S. Cl.
USPC ........................................... 353/85; 315/224

(58) Field of Classification Search
USPC ................ 353/84, 85; 315/37, 106, 224, 246, 315/291, 308
See application file for complete search history.

(56) References Cited

U.S. PATENT DOCUMENTS 7,023,144 B2 * 4/2006 Suzuki et al. ................. 315/246
2001/0038267 A1 11/2001 Ono et al.
(Continued)

FOREIGN PATENT DOCUMENTS

| JP | 2001-312997 | 11/2001 |
| JP | 2003-133091 | 5/2003 |
| JP | 2005-190766 | 7/2005 |

(Continued)

*Primary Examiner* — Thanh Luu
*Assistant Examiner* — Renee Naphas
(74) *Attorney, Agent, or Firm* — Hamre, Schumann, Mueller & Larson, P.C.

(57) ABSTRACT

Constant current control is performed after the completion of starting operation of a high-pressure mercury-vapor lamp 4 and then lighting is shifted to constant power lighting. Except during a modulation forbidden period as a certain period from the completion of the starting operation, the frequency of an alternating current is subjected to frequency modulation control for being modulated to at least a first frequency and a second frequency having higher audibility than the first frequency. During the modulation forbidden period defined as a period from the completion of the starting operation until a predetermined time before lighting is shifted to constant power lighting, from the completion of the starting operation until lighting is shifted to constant power lighting, or from the completion of the starting operation until a predetermined time after lighting has been shifted to constant power lighting, the frequency modulation control is not performed and an alternating current with a third frequency lower than the second frequency is supplied. The quietness can be increased without adversely affecting the frequency modulation control on an alternating current for properly growing and maintaining protrusions of electrodes.

22 Claims, 19 Drawing Sheets

U.S. PATENT DOCUMENTS

2003/0080693 A1  5/2003  Ono et al.
2005/0140311 A1  6/2005  Suzuki et al.
2005/0206326 A1  9/2005  Suzuki et al.
2006/0022613 A1  2/2006  Suzuki et al.

FOREIGN PATENT DOCUMENTS

JP  2006-59790   3/2006
JP  3851343      9/2006
JP  2006-332015  12/2006

* cited by examiner

HIGH-PRESSURE DISCHARGE LAMP LIGHTING DEVICE WITH CURRENT CONTROL, HIGH-PRESSURE DISCHARGE LAMP DEVICE USING SAME, PROJECTOR USING SAID HIGH-PRESSURE DISCHARGE LAMP DEVICE, AND HIGH-PRESSURE DISCHARGE LAMP LIGHTING METHOD WITH CURRENT CONTROL

TECHNICAL FIELD

The present invention relates to high-pressure discharge lamp lighting devices and particularly to improvements for properly growing and maintaining protrusions of electrodes and also improving quietness. Further, the present invention relates to a high-pressure discharge lamp device using the lighting device, a projector using the high-pressure discharge lamp device and a high-pressure discharge lamp lighting method.

BACKGROUND ART

Projectors are one type of projection-type display devices that modulate emitted light from a light source in response to image information and magnify and project the optical image. Recently, projectors, together with personal computers, have been widely used for presentations at conferences and the like. Further, projectors also have been used in ordinary households for a home theater application.

For example, high-pressure mercury-vapor lamps, which are closer to a point source and have high color rendering, have been utilized in projectors as their light sources. Specifically, such a high-pressure mercury-vapor lamp is provided with an arc tube filled with mercury as a light-emitting material in an amount of, for example, 200 mg/cm$^3$ or more and a pair of electrodes made of tungsten is disposed in the arc tube to substantially face each other. In addition to mercury, the arc tube is also filled with a halogen material. Consequently, a so-called halogen cycle effect is used to prevent tungsten as a constituent material of the electrodes from being scattered during lighting and adhering to the inner surface of the arc tube to cause blackening of the inner surface.

On one hand, the use of the halogen cycle effect allows the prevention of blackening of the arc tube inner surface. But on the other hand, it has been known that tungsten scattered from the electrodes returns and adheres to the electrodes, forming protrusions as it is being accumulated. When such protrusions are formed properly on the tips of the electrodes, the tips form arc bright spots, thereby allowing a stable arc and the prevention of occurrence of a so-called flicker resulting from movements of the arc cathode spots.

For this reason, it has been proposed conventionally to change the frequency of an alternating current supplied to a high-pressure mercury-vapor lamp in order to grow and maintain the protrusions properly for stabilizing an arc on the tips of the electrodes (Patent document 1, for example).

Further, as a method of changing the frequency of an alternating current, a method of changing the frequency constantly without depending on operation data of a lamp, in other words frequency modulation control, has been known (Patent document 2, for example). Unlike so-called restorative control where the control is performed after the protrusions become deformed, in this method, control is performed before the protrusions become deformed. Therefore, this method is advantageous in that the initial shape of the protrusions can be stably maintained.

A high-pressure mercury-vapor lamp of such a type is started and is lighted as follows. That is, for example, after a high voltage has been applied and a discharge has started (after an electrical breakdown between the electrodes), a starting operation is performed to stabilize the discharge. During the starting operation, constant current control using a high-frequency current selected from the range of 10 kHz to 500 kHz, for example, is performed for a certain period of time. After the completion of the starting operation, constant current control using a substantially square wave current with a frequency selected from the range of 20 Hz to 1000 Hz, for example, is performed. And afterwards, lighting is shifted to constant power lighting.

Patent document 1: JP 2001-312997 A
Patent document 2: Japanese Patent No. 3851343 A

DISCLOSURE OF INVENTION

Problem to be Solved by the Invention

However, a study conducted by the present inventors has revealed that electronic components, etc., of a high-pressure discharge lamp lighting device produce a harsh noise depending on the frequencies to be combined when performing the frequency modulation control in order to control the protrusions of the electrodes. This noise is produced during a low lamp voltage state after the starting operation until the lamp is started, i.e., after the start of discharge of the lamp by a supply of a high voltage until a transition to lighting with a substantially square wave current in the range of 20 Hz to 1000 Hz. In other words, the noise is produced during a high lamp current state.

In many cases, projectors equipped with such high-pressure discharge lamp lighting devices are used to start projection of images right after the starting operation of the lamp completes. Therefore, to achieve a comfortable listening and viewing environment, it is necessary to suppress the above-mentioned noise from the lighting device as soon as possible. When an alternating current to be supplied is modulated to a frequency with high audibility and frequency with low audibility, the frequency responsible for the production of the noise is to be inputted intermittently. The noise produced in this way sounds much harsher than a noise produced seamlessly when the frequency is fixed to one frequency responsible for the production of the noise. In particular, suppression of this noise is desired strongly for projectors that project video with sound.

To this problem, not performing the frequency modulation control can result in an improvement in the production of the noise. However, the protrusions of the electrodes cannot be grown and maintained properly, thereby causing the occurrence of flicker resulting from movements of the arc cathode spots.

With the foregoing in mind, it is an object of the present invention to provide a high-pressure discharge lamp lighting device whose quietness can be improved without adversely affecting the frequency modulation control on an alternating current performed to grow and maintain the protrusions of the electrodes properly.

Further, another object of the present invention is to provide a high-pressure discharge lamp device using such a high-pressure discharge lamp lighting device, a projector using the high-pressure discharge lamp device and a high-pressure discharge lamp lighting method.

Means for Solving Problem

A common configuration of the high-pressure discharge lamp lighting device of the present invention is as follows: a high-pressure discharge lamp lighting device for lighting, by supplying an alternating current, a high-pressure discharge lamp provided with an arc tube filled with a halogen material and including electrodes disposed therein with protrusions being formed on tips of the electrodes, the lighting device controlling so that constant current control is performed first after completion of a starting operation performed at a beginning of lighting and then the lighting is shifted to constant power lighting.

To solve the above-described problems, in the high-pressure discharge lamp lighting device of the present invention having a first configuration, except during a modulation forbidden period set as a certain period from the completion of the starting operation, a frequency of the alternating current is subjected to frequency modulation control for being modulated to at least a first frequency and a second frequency having higher audibility than the first frequency. During the modulation forbidden period defined as a period (a) from the completion of the starting operation until a predetermined time before the lighting is shifted to the constant power lighting, (b) from the completion of the starting operation until the lighting is shifted to the constant power lighting, or (c) from the completion of the starting operation until a predetermined time after the lighting has been shifted to the constant power lighting, the frequency modulation control is not performed and an alternating current with a third frequency lower than the second frequency is supplied.

In the high-pressure discharge lamp lighting device of the present invention having a second configuration, except during a modulation forbidden period set as a certain period from the completion of the starting operation, a frequency of the alternating current is subjected to frequency modulation control for being modulated to at least a first frequency and a second frequency having higher audibility than the first frequency. The modulation forbidden period is defined as a predetermined time selected from a range of 60 s to 300 s from the completion of the starting operation, and during the modulation forbidden period the frequency modulation control is not performed and an alternating current with a third frequency lower than the second frequency is supplied.

In the high-pressure discharge lamp lighting device of the present invention having a third configuration, except during a modulation forbidden period set as a certain period from the completion of the starting operation, a frequency of the alternating current is subjected to frequency modulation control for being modulated to a first frequency selected from a range of 20 Hz to 200 Hz and a second frequency selected from a range of 300 Hz to 1000 Hz, while inputting an alternating current with a third frequency lower than the first frequency and selected from a range of 5 Hz to 150 Hz by interrupting the alternating current with the second frequency.

Input cycles of the alternating current with the first frequency are in the range of 0.5 cycles to 10 cycles per input, input cycles of the alternating current with the second frequency are in the range of 2 cycles to 200 cycles per input, input cycles of the alternating current with the third frequency are in the range of 0.5 cycles to 150 cycles per input, and a time interval at which the alternating current with the third frequency is inputted by interrupting the alternating current with the second frequency is in the range of 130 s to 300 s.

During the modulation forbidden period defined as a period (a) from the completion of the starting operation until a predetermined time before the lighting is shifted to the constant power lighting, (b) from the completion of the starting operation until the lighting is shifted to the constant power lighting, or (c) from the completion of the starting operation until a predetermined time after the lighting has been shifted to the constant power lighting, the frequency modulation control is not performed and an alternating current with a fourth frequency selected from a range of 50 Hz to 200 Hz is supplied.

A common configuration of the high-pressure discharge lamp lighting methods of the present invention is as follows: a high-pressure discharge lamp lighting method for lighting, by supplying an alternating current, a high-pressure discharge lamp provided with an arc tube filled with a halogen material and including electrodes disposed therein with protrusions being formed on tips of the electrodes, in the lighting method, constant current control is performed first after completion of a starting operation performed at a beginning of lighting and then the lighting is shifted to constant power lighting.

To solve the above-described problems, according to the high-pressure discharge lamp lighting method of the present invention having a first configuration, except during a modulation forbidden period set as a certain period from the completion of the starting operation, a frequency of the alternating current is subjected to frequency modulation control for being modulated to at least a first frequency and a second frequency having higher audibility than the first frequency. During the modulation forbidden period defined as a period (a) from the completion of the starting operation until a predetermined time before the lighting is shifted to the constant power lighting, (b) from the completion of the starting operation until the lighting is shifted to the constant power lighting, or (c) from the completion of the starting operation until a predetermined time after the lighting has been shifted to the constant power lighting, the frequency modulation control is not performed and an alternating current with a third frequency lower than the second frequency is supplied.

According to the high-pressure discharge lamp lighting method of the present invention having a second configuration, except during a modulation forbidden period set as a certain period from the completion of the starting operation, a frequency of the alternating current is subjected to frequency modulation control for being modulated to at least a first frequency and a second frequency having higher audibility than the first frequency. The modulation forbidden period is defined as a predetermined time selected from a range of 60 s to 300 s from the completion of the starting operation, and during the modulation forbidden period the frequency modulation control is not performed and an alternating current with a third frequency lower than the second frequency is supplied.

According to the high-pressure discharge lamp lighting method of the present invention having a third configuration, except during a modulation forbidden period set as a certain period from the completion of the starting operation, a frequency of the alternating current is subjected to frequency modulation control for being modulated to a first frequency selected from a range of 20 Hz to 200 Hz and a second frequency selected from a range of 300 Hz to 1000 Hz, while inputting an alternating current with a third frequency lower than the first frequency and selected from a range of 5 Hz to 150 Hz by interrupting the alternating current with the second frequency.

Input cycles of the alternating current with the first frequency are in the range of 0.5 cycles to 10 cycles per input, input cycles of the alternating current with the second frequency are in the range of 2 cycles to 200 cycles per input, input cycles of the alternating current with the third frequency are in the range of 0.5 cycles to 150 cycles per input, and a time interval at which the alternating current with the third frequency is inputted by interrupting the alternating current with the second frequency is in the range of 130 s to 300 s.

During the modulation forbidden period defined as a period (a) from the completion of the starting operation until a predetermined time before the lighting is shifted to the constant power lighting, (b) from the completion of the starting operation until the lighting is shifted to the constant power lighting, or (c) from the completion of the starting operation until a predetermined time after the lighting has been shifted to the constant power lighting, the frequency modulation control is not performed and an alternating current with a fourth frequency selected from a range of 50 Hz to 200 Hz is supplied.

In the present invention, the "constant current control" performed after the completion of the starting operation not only refers to control for keeping a current value constant but also to control in general in which a current is limited to prevent an overcurrent from flowing through the lamp during the low lamp voltage state, which lasts until the lamp is started. Thus, a case where the current value is not constant is included. Although the constant power control performed after the lamp has started could be considered as a kind of the constant current control, in the present invention, the constant power control is not one kind of the constant power control.

Effects of the Invention

According to the high-pressure discharge lamp lighting devices or lighting methods having the above-described configurations, by not performing the frequency modulation control on an alternating current during a certain period from the completion of the starting operation but supplying an alternating current with a frequency less likely to be responsible for the production of noise, the production of noise resulting from the frequency modulation control can be suppressed without adversely affecting control on the protrusions of the electrodes.

Figure 1:
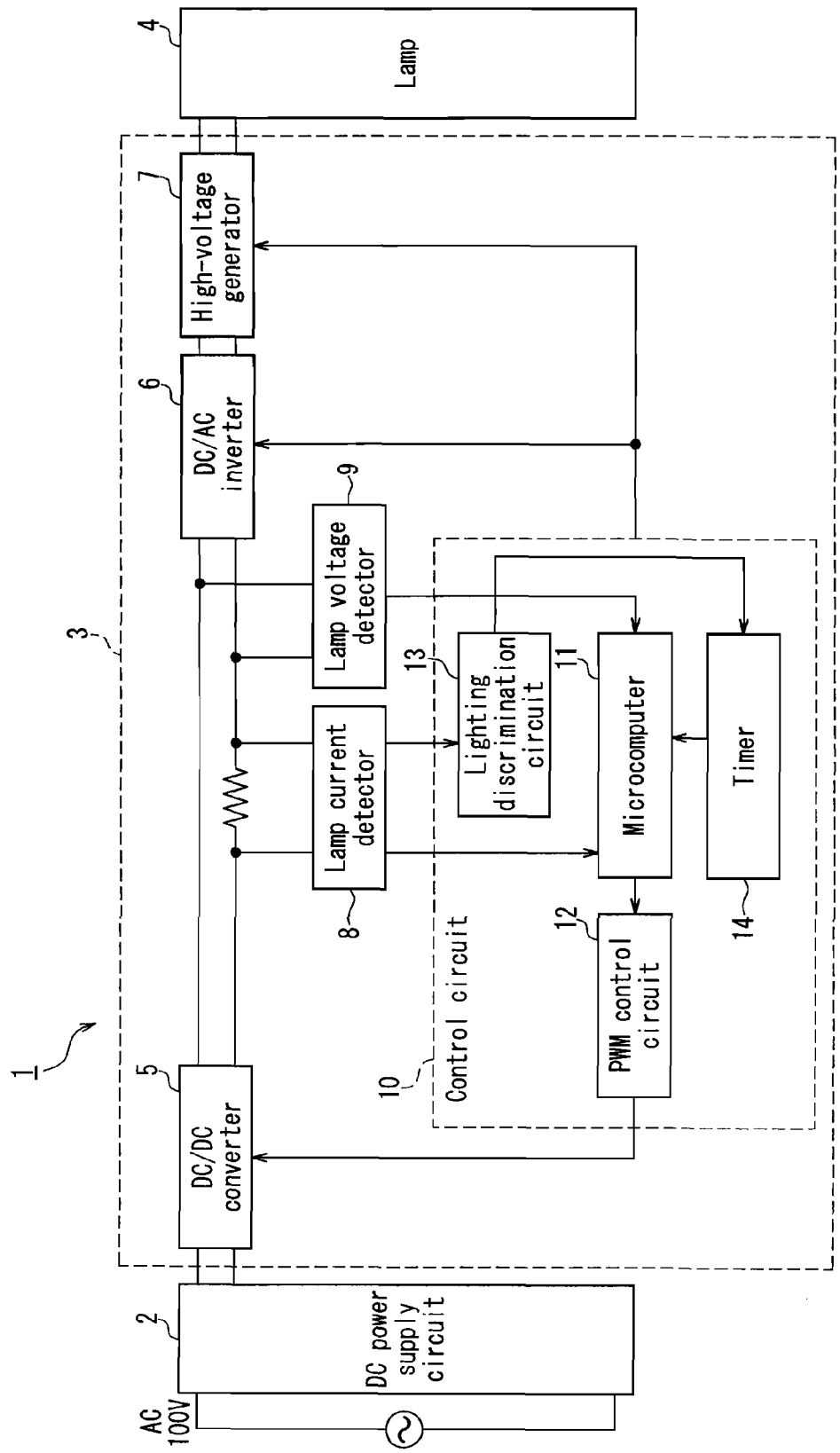
FIG. 1 is a block diagram showing a configuration of a high-pressure discharge lamp device according to Embodiment 1 of the present invention.

DESCRIPTION OF REFERENCE NUMERAL 1 high-pressure discharge lamp device
2 DC power supply circuit
3 high-pressure discharge lamp lighting device
4 high-pressure mercury-vapor lamp
5 DC/DC converter
6 DC/AC inverter
7 high voltage generator
8 lamp current detector
9 lamp voltage detector
10 control circuit
11 microcomputer
12 PWM control circuit
13 lighting discrimination circuit
14 timer
15 arc tube
16 light-emitting portion
17 sealing portion
18 discharge space 19 electrode
20 electrode rod
21 electrode coil
22 tip of electrode
23 protrusion
24 metal foil
25 external lead wire
26 reflection mirror
27 lamp unit
28 reflection surface
29 power connection terminal
30 base
31 power supply line
32 neck portion
33 adhesive
34 through hole
35 front projector
36, 43 housing
37 optical unit
38 control unit
39 projection lens
40 cooling fan unit
41 power supply unit
42 rear projector
44 translucent screen Description of the Invention The high-pressure discharge lamp lighting device of the present invention, having the basic configuration as above, can be configured as follows.

That is, in the high-pressure discharge lamp lighting device having the first or second configuration, the third frequency preferably is selected from the range of 50 Hz to 200 Hz.

Further, the second frequency preferably is selected from the range of 300 Hz to 1000 Hz.

Further, when the lamp voltage of the high-pressure discharge lamp falls below a certain value after a lapse of the modulation forbidden period, the frequency modulation control preferably is stopped and an alternating current with a fourth frequency selected from the range of 300 Hz to 1000 Hz is supplied.

Further, the fourth frequency preferably is set to be higher than the second frequency by 10 Hz or more.

Further, in the high-pressure discharge lamp lighting device having the third configuration, the third frequency preferably is set to be lower than the first frequency by 5 Hz or more.

Further, when a lamp voltage of the high-pressure discharge lamp falls below a certain value after a lapse of the modulation forbidden period, an alternating current with a fifth frequency selected from the range of 300 Hz to 1000 Hz preferably is supplied.

Further, the fifth frequency preferably is set to be higher than the second frequency by 10 Hz or more.

The high-pressure discharge lamp device of the present invention may include a high-pressure discharge lamp provided with an arc tube filled with a halogen material and including electrodes disposed therein, protrusions being formed on tips of the electrodes, and the high-pressure discharge lamp lighting device having any one of the above-described configurations for lighting the high-pressure discharge lamp.

The projector of the present invention may include: the high-pressure discharge lamp device having the above-described configuration; an optical unit for forming an optical image by modulating illumination light from the high-pressure discharge lamp; and a projection lens for magnifying and projecting the optical image.

In the high-pressure discharge lamp lighting method having the first or second configuration, the third frequency preferably is selected from the range of 50 Hz to 200 Hz.

Further, the second frequency preferably is selected from the range of 300 Hz to 1000 Hz.

Further, when the lamp voltage of the high-pressure discharge lamp falls below a certain value after a lapse of the modulation forbidden period, the frequency modulation control is preferably stopped and an alternating current with a fourth frequency selected from the range of 300 Hz to 1000 Hz is supplied.

Further, the fourth frequency preferably is set to be higher than the second frequency by 10 Hz or more.

Further, in the high-pressure discharge lamp lighting method having the third configuration, the third frequency preferably is set to be lower than the first frequency by 5 Hz or more.

Further, when the lamp voltage of the high-pressure discharge lamp falls below a certain value after a lapse of the modulation forbidden period, an alternating current with a fifth frequency selected from the range of 300 Hz to 1000 Hz is preferably supplied.

Further, the fifth frequency preferably is set to be higher than the second frequency by 10 Hz or more.

Hereinafter, embodiments of the present invention will be described with reference to the drawings.

(Embodiment 1)

FIG. 1 is a block diagram of a high-pressure discharge lamp device 1 according to Embodiment 1 of the present invention. The high-pressure discharge lamp device 1 is composed of a DC power supply circuit 2 connected to an external AC power source (100V), a high-pressure discharge lamp lighting device 3 (electronic ballast) connected to the DC power supply circuit 2, and a high-pressure mercury-vapor lamp 4 as an example of a high-pressure discharge lamp to which power is supplied from the high-pressure discharge lamp lighting device 3.

The DC power supply circuit 2 includes a rectifier circuit (not shown), for example, and generates a constant direct voltage from a household AC power source (100V) and supplies the generated direct voltage to the high-pressure discharge lamp lighting device 3.

The high-pressure discharge lamp lighting device 3 is composed primarily of a DC/DC converter 5, a DC/AC inverter 6, a high voltage generator 7, a lamp current detector 8, a lamp voltage detector 9 and a control circuit 10.

The DC/DC converter 5 receives a PWM (Pulse Width Modulation) control signal from the control circuit 10 and supplies a direct current with a predetermined intensity to the DC/AC inverter 6. During stable lighting (steady lighting), it is necessary to perform control to keep the lamp power constant (constant power control) in order to keep a light output of the high-pressure mercury-vapor lamp 4 constant. Thus, at the control circuit 10, a microcomputer 11 calculates the lamp power based on a lamp current detected by the lamp current detector 8 and a lamp voltage detected by the lamp voltage detector 9, and a PWM control circuit 12 sends to the DC/DC converter 5 a PWM control signal so as to keep the lamp power constant. Based on the received PWM control signal, the DC/DC converter 5 converts a direct voltage from the DC power supply circuit 2 to a direct current with a predetermined intensity.

However, during the low lamp voltage state from the completion of starting operation of the lamp until the lamp is started, in other words, during the high lamp current state, the control circuit 10 sends to the DC/DC converter 5 a PWM control signal controlled so that the constant current control is performed.

The DC/AC inverter 6 controls the direct current from the DC/DC converter 5 based on the control signal from the control circuit 10, so as to generate an alternating voltage and alternating current at a predetermined frequency. That is, the DC/AC inverter 6 operates at a high frequency of 10 kHz or more to generate a high-frequency voltage before the high-pressure mercury-vapor lamp 4 starts a discharge. The DC/AC inverter 6 keeps generating a high-frequency current for several seconds after a current has been flowing between a pair of electrodes 19 (described later) of the high-pressure mercury-vapor lamp 4 following the start of discharge.

Except during a certain period (modulation forbidden period) after the completion of the starting operation until a lighting discrimination circuit 13 in the control circuit 10 detects lighting, the lighting is shifted to constant current control lighting using a substantially square wave current with a frequency selected from the range of 20 Hz to 1000 Hz, and the microcomputer 11 sends frequency control signals to the DC/AC inverter 6 to modulate a current to a predetermined frequency as desired. That is, based on frequency control signals sent from the microcomputer 11, the control circuit 10 sends control signals to the DC/AC inverter 6 to generate alternating currents with different frequencies. Thus, by changing a setting program of the microcomputer 11 adequately, alternating currents with a variety of desired frequencies can be obtained.

The high voltage generator 7 includes a transformer (not shown), for example, and generates and applies a high voltage to the high-pressure discharge lamp 4 to cause an electrical breakdown between the electrodes 19 of the high-pressure mercury-vapor lamp 4 and start the high-pressure mercury-vapor lamp 4.

In addition to the microcomputer 11, the PWM control circuit 12 and the lighting discrimination circuit 13 mentioned above, the control circuit 10 further includes a timer 14, etc. The timer 14 starts a count when "lighting is detected" by the lighting discrimination circuit 13 and the count continues until a lapse of the certain period of time after the completion of the starting operation. The microcomputer 11 starts frequency control on a substantially square wave current (output of a frequency control signal) based on the count. To cause the microcomputer 11 to start the modulation control, it is also possible to apply a known technique that causes the microcomputer 11 to start the modulation control based on a criterion different from the count by the timer 14. In that case, the timer 14 may not be required.

Next, as an example of a high-pressure discharge lamp, a general configuration of the high-pressure mercury-vapor lamp 4 (constant power: 180 W) will be described with reference to FIG. 2. An arc tube 15 of the high-pressure mercury-vapor lamp 4 includes an enclosure whose constituent material is, for example, silica glass, and has a substantially-spheroidal light-emitting portion 16 at the center of the tube and substantially-cylindrical sealing portions 17 coupled to the light-emitting portion 16 so as to extend outwardly from the both sides of the light emitting portion 16.

The inside (discharge space 18) of the light-emitting portion 16 is filled with predetermined amounts of mercury (Hg) as a light-emitting material, argon gas (Ar), krypton gas (Kr) or xenon gas (Xe) or mixed gas of two or more gases as a start-assisting rare gas and iodine (I) or bromine (Br) or a mixture thereof for the halogen cycle effect. As an example, in the light-emitting portion 16, the amount of mercury is set within the range of 150 mg/cm$^3$ to 390 mg/cm$^3$, the amount of argon gas (25° C.) is set within the range of 0.01 MPa to 1 MPa, and the amount of bromine is set within the range of $1\times10^{-10}$ mol/cm$^3$ to $1\times10^{-4}$ mol/cm$^3$, preferably $1\times10^{-9}$ mol/cm$^3$ to $1\times10^{-5}$ mol/cm$^3$.

Further, the pair of electrodes 19 made of tungsten (W) are disposed in the light-emitting portion 16 such that one ends of the electrodes 19 face each other. As an example, a distance L (see FIG. 2) between the pair of electrodes 19 is set within the range of 0.5 mm to 2.0 mm.

Figure 3:
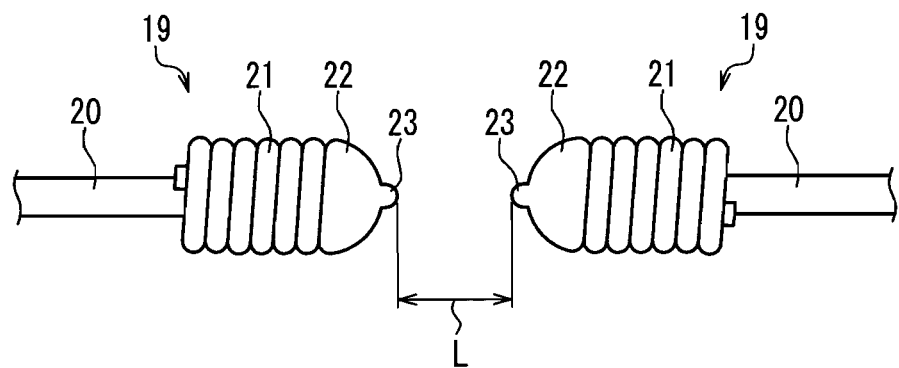
FIG. 3 is a front view showing a configuration of electrodes as components of the arc tube of the high-pressure discharge lamp device.

As shown in FIG. 3, the electrodes 19 are each composed of an electrode rod 20 and an electrode coil 21 attached to one end of the electrode rod 20. The tip 22 (one end) of each electrode 19 is made into, for example, a substantially-hemispherical, substantially-spherical or substantially-conical shape by melting a part of the electrode rod 20 and a part of the electrode coil 21 integrally. Further, due to the halogen cycle effect during lighting, protrusions 23 are self-formed on the tips 22 of the electrodes 19 without machining them. That is, during lighting using a substantially square wave current with a frequency selected from the range of 20 Hz to 1000 Hz, tungsten as a constituent material of the electrodes 19 evaporates but returns afterwards to the electrodes 19, particularly to each peak of the tips 22, and accumulates thereon because of the halogen. The protrusions 23 are formed from the accumulation. The protrusions 23 shown herein are formed during a lighting step of the manufacturing process, and they have already been formed by the time of completion of production. Specifically, the distance L between the electrodes 19 refers to a distance between these protrusions 23.

In order to make each tip portion of the electrodes 19 into, for example, a substantially-hemispherical, substantially-spherical or substantially-conical shape, other than to melt a part of the electrode rod 20 and a part of the electrode coil 21 a component shaved to have a substantially-hemispherical, substantially-spherical or substantially-conical shape in advance or a component sintered into such a shape may be attached to the tip of the electrode rod 20.

Figure 2:
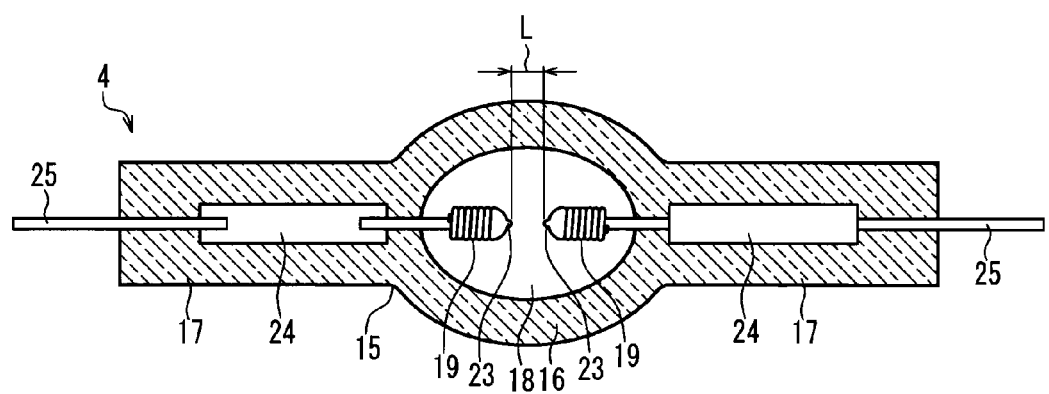
FIG. 2 is a front cross-sectional view showing an arc tube of a high-pressure mercury-vapor lamp included in the high-pressure discharge lamp device.

As shown in FIG. 2, the other ends of the electrodes 19 are each connected to one end of an external lead wire 25 through a metal foil 24 made of molybdenum airtightly attached to the sealing portion 17. Each of the other ends of the external lead wires 25 projects from an end surface of the sealing portion 17 outwardly and is connected to a power supply line, base or the like (none of them is shown).

Figure 4:
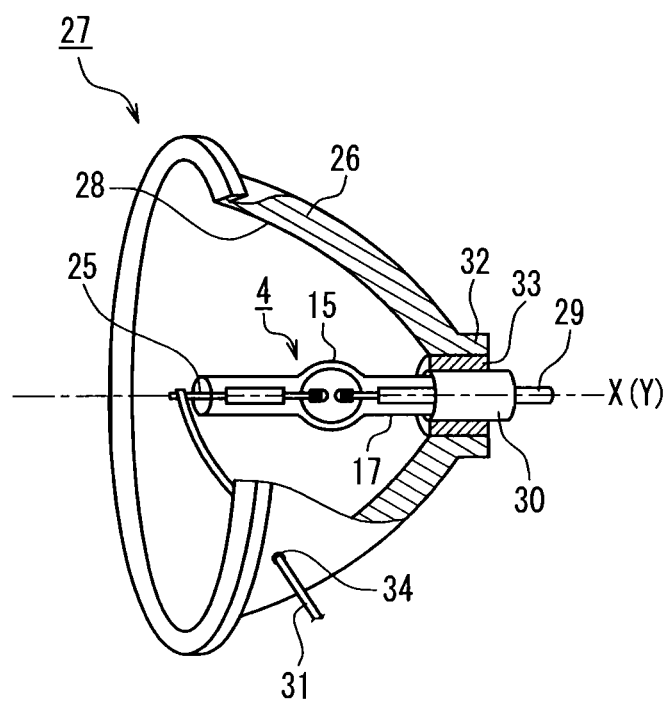
FIG. 4 is a partial cross-sectional perspective view showing a lamp unit included in the high-pressure discharge lamp device.

And as shown in FIG. 4, such a high-pressure mercury-vapor lamp 4 is incorporated into a reflection mirror 6 to form a lamp unit 27. The lamp unit 27 includes the above-described high-pressure mercury-vapor lamp 4 and the reflection mirror 26 having a reflection surface 28 with a concave inner surface, which is formed on a substrate made of glass or metal. The high-pressure mercury-vapor lamp 4 is incorporated into the reflection mirror 26 such that the central axis X of the high-pressure mercury-vapor lamp 4 in the longitudinal direction and the optical axis Y of the reflection mirror 26 substantially coincide with each other. Light emitted from the high-pressure mercury-vapor lamp 4 is reflected on the reflection surface 28. The reflection surface 28 is composed of, for example, a spheroid or paraboloid surface and a multilayered interference film or the like is evaporated thereon.

The high-pressure mercury-vapor lamp 4 is equipped with a cylindrical base 30 provided with a power connection terminal 29 at one of the sealing portions 17 of the arc tube 15. The external lead wire 25 leading outwardly from that sealing portion 17 is connected to the power connection terminal 29. The other external lead wire 25 is connected to a power supply line 31. And with regard to the high-pressure mercury-vapor lamp 4, the base 30 is inserted in a neck portion 32 of the reflection mirror 26 and is fixed thereto with an adhesive 33. Meanwhile, the power supply line 31 is inserted into a through hole 34 formed in the reflection mirror 26.

Figure 5:
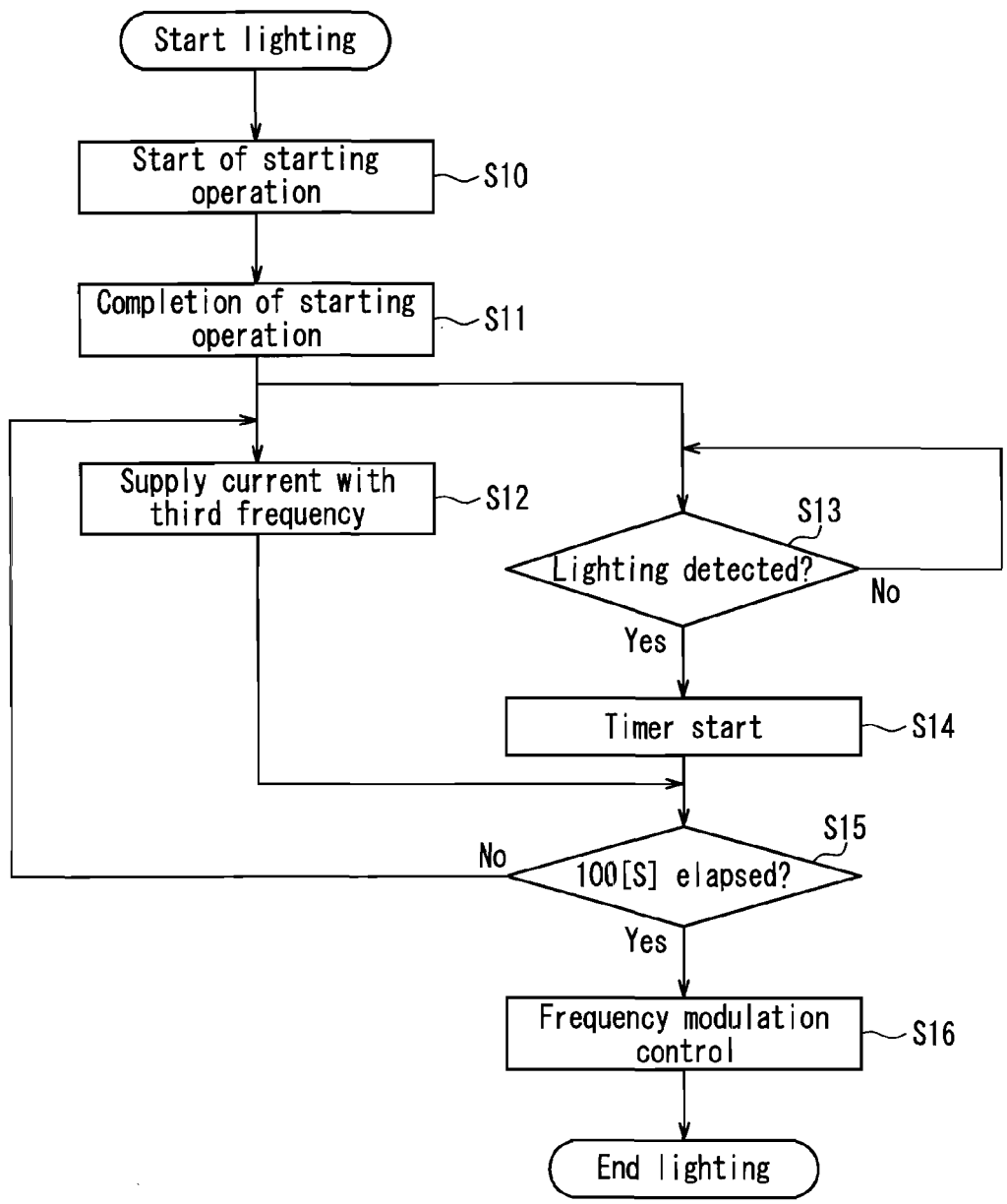
FIG. 5 is a flowchart showing a frequency control operation on an alternating current by a high-pressure discharge lamp lighting device included in the high-pressure discharge lamp device.

Next, an operation example of the high-pressure discharge lamp lighting device 3 according to the present embodiment will be described with reference to FIGS. 1, 2 and 5. FIG. 5 is a flowchart showing a frequency control operation on an alternating current in the high-pressure discharge lamp lighting device 3.

(1) First, when a lighting switch (not shown) for causing the high-pressure mercury-vapor lamp 4 to start a discharge is turned on, the starting operation starts (step S10) and the high voltage generator 7 applies a high voltage with a high frequency (e.g., 3 kV, 100 kHz) to the high-pressure mercury-vapor lamp 4.

(2) When an electrical breakdown occurs between the electrodes 19 in the high-pressure mercury-vapor lamp 4, a high-frequency arc discharge current starts to flow between the electrodes 19. That is, the high-pressure mercury-vapor lamp 4 starts a discharge. For a certain period after the start of discharge, the high-frequency output is kept being applied to the high-pressure mercury-vapor lamp 4. The end of this certain period after the start of discharge is set to, for example, 2 s (sec.) from the start of the starting operation. Thereafter, that is, after a lapse of 2 s, for example, 2 s is set as a period for warming up the electrodes 19 to stabilize the discharge further. During the warm-up period, the constant current control lighting using a high-frequency current selected from the range of 10 kHz to 500 kHz, in other words, a high-frequency operation is maintained. The high-frequency operation ends at the same time as the warm-up period (2 s) elapses, and the so-called starting operation is ended (step S11).

With respect to the starting operation, the output from the high voltage generator 7 for causing the high-pressure mercury-vapor lamp 4 to start a discharge is not limited to a high voltage with a high frequency, and a known intermittent oscillation high voltage pulse may be used as an alternative. Further, the way to stabilize an arc discharge after the start of discharge is not limited to the high-frequency operation, and a known direct-current operation or a constant current control operation using a low-frequency current of 20 Hz or less may be used as an alternative.

(3-1) After the completion of the starting operation, a transition to a "low-frequency operation" takes place. In the present invention, the "low-frequency operation" is defined as constant current control (e.g., constant 3 A) lighting using a substantially square wave current with a frequency selected from the range of 20 Hz to 1000 Hz. Although the constant current control at 3 A is shown as an example, the "constant current control" herein not only simply refers to control for keeping a current value constant but also to control in general that limits a current to prevent an overcurrent from flowing through the lamp during the low lamp voltage state, which lasts until the lamp is started (hereinafter the same).

The control circuit 10 performs the constant current control (e.g., constant 3 A) until the lamp voltage rises and reaches a predetermined voltage (e.g., 60V) along with evaporation of mercury. In the constant current control, first, an alternating current with a frequency fixed to a third frequency lower than a second frequency (e.g., 340 Hz, described later), for example, fixed to 170 Hz, is supplied to the high-pressure mercury-vapor lamp 4 (step S12).

Meanwhile, the lighting discrimination circuit 13 performs "lighting detection" based on a lamp current detection signal from the lamp current detector 8 (step S13) and determines whether it is "after the completion of the starting operation" or not. And as shown in FIG. 5, the timer 14 starts a count in response to the "lighting detection" (step S14). Practically, however, the lighting discrimination circuit 13 detects lighting almost at the same time (after about one cycle of the third frequency) as the constant current control at the third frequency starts. Thus, the timer 14 starts a count substantially at the same time as the transition to the low-frequency operation takes place.

Figure 6:
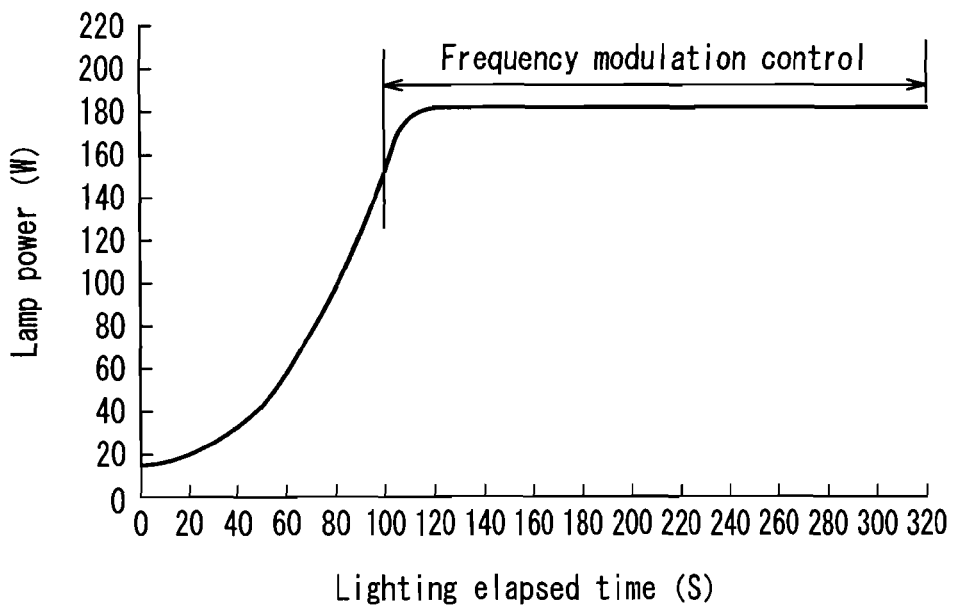
FIG. 6 is a diagram showing a change in lamp power in the high-pressure discharge lamp device along with lighting elapsed time.

Here, the timer setting time of the timer 14 is set to 100 s, for example. The supply of alternating current with the third frequency at step S12 is dependent on step S15. That is, unless the time counted by the timer elapses 100 s, an alternating current to be supplied will not be subjected to the frequency modulation control (described later) and is maintained at the third frequency (170 Hz) (step S15: NO). As shown in FIG. 6, the timer setting time of 100 s is set to a time from the completion of the starting operation (cold start) until a predetermined time before lighting is shifted to constant power (180 W) lighting. The horizontal axis in FIG. 6 indicates lighting elapsed time [s] and the vertical axis indicates lamp power [w]. The lighting elapsed time is elapsed time from the start of the low-frequency operation (completion of the starting operation). The same holds true for FIGS. 7 and 8 (described later).

As described above, when the timer setting time is set to "from the completion of the starting operation until a predetermined time before lighting is shifted to constant power lighting", the "predetermined time" is preferably longer in terms of achieving as much quietness as possible as will be discussed later. For example, the lower limit is preferably 60 s or more from the completion of the starting operation. However, the time from the completion of the starting operation until lighting is shifted to constant power (180 W) lighting is a unique value determined by the specifications of the high-pressure mercury-vapor lamp 4 to be used and is determined from the accumulation of experiments. Here, the time is 120 s. Further, practically, the time may vary depending on the individual high-pressure mercury-vapor lamps 4, and depending on a variety of conditions such as employing hot start, the time from the completion of the starting operation until lighting is shifted to constant power lighting may vary. However, the variations are not significant and have no impact on the effects described later.

In the present embodiment and in other embodiments described later, an alternating current to be supplied to the high-pressure mercury-vapor lamp 4 is specifically a substantially square wave current. The "substantially square wave current" herein refers to a current with a perfect square wave, as a matter of course, and also a current with a distorted square wave caused by overshoot, etc. Further, the "substantially square wave current" also includes an alternating current with a waveform that has been known conventionally as a lighting method that suppresses movements of the arc cathode spots of the high-pressure mercury-vapor lamp 4. That is, an AC waveform in which a pulse current is superimposed, based on a square wave current, prior to a polarity inversion at every half cycle, an alternating waveform inclined, based on a square wave current, so that a current value increases with time at every half cycle, an AC waveform in which, based on a square wave current, one cycle of high frequency is added immediately before or after a polarity inversion at every cycle and only the lamp current on the later half cycle of the added waveform is increased to be higher than the current value immediately before the addition. Here, the frequency of substantially square wave current refers to the frequency of square wave current considered to be the basis of the substantially square wave current.

(4-1) When the count by the timer 14 elapses 100 s (step S15: YES), an alternating current to be supplied is subjected to frequency modulation control to change the frequency from the fixed value of the third frequency (170 Hz) to the first frequency (e.g., 60 Hz) and the second frequency (e.g., 340 Hz) alternately (step S16). Thereafter, the frequency modulation control is maintained until the light is turned off (lighting switch OFF).

Meanwhile, as shown in FIG. 6, when the lamp voltage rises and reaches a predetermined voltage value (e.g., 60 V), a transition to the constant power control for keeping the lamp power constant (180 W) takes place (not shown) regardless of the count by the timer 14. That is, the control circuit 10 uses the microcomputer 11 to calculate the lamp power based on a current value detected by the lamp current detector 8 and a voltage value detected by the lamp voltage detector 9, and controls an output current of the DC/DC converter 5 by sending a PWM control signal to the DC/DC converter 5 so as to keep the power constant.

Figure 7:
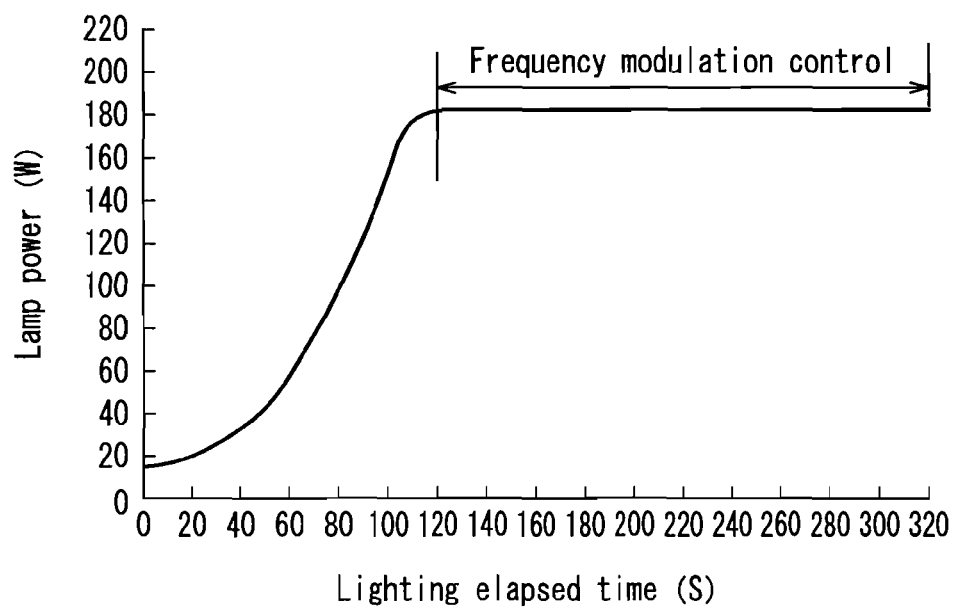
FIG. 7 is a diagram showing a change in lamp power along with lighting elapsed time in Modified Example 1 of the high-pressure discharge lamp device.
Figure 8:
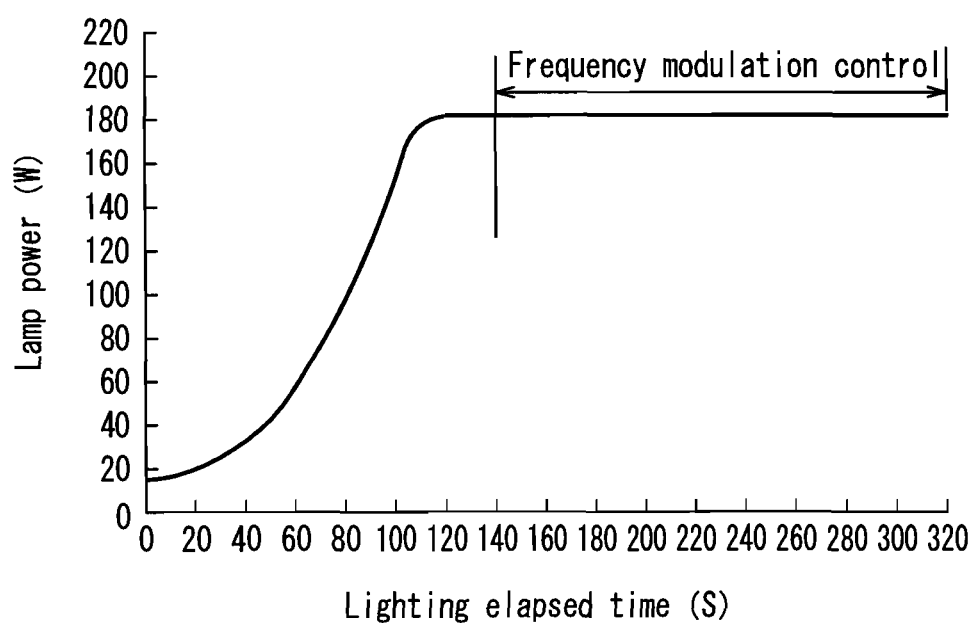
FIG. 8 is a diagram showing a change in lamp power along with lighting elapsed time in Modified Example 2 of the high-pressure discharge lamp device.
Figure 9:
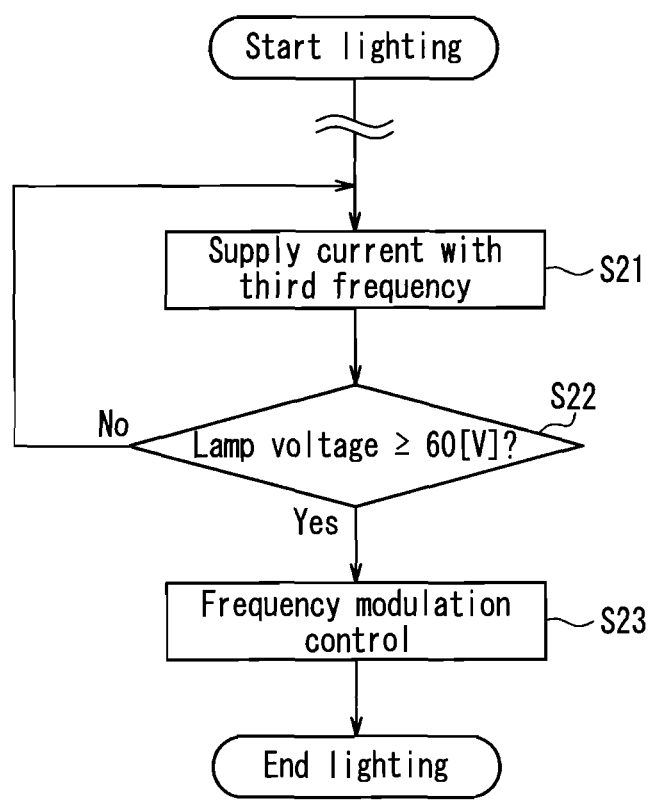
FIG. 9 is a flowchart showing a frequency control operation on an alternating current by a high-pressure discharge lamp lighting device included in Modified Example 1 of the high-pressure discharge lamp device.
Figure 10:
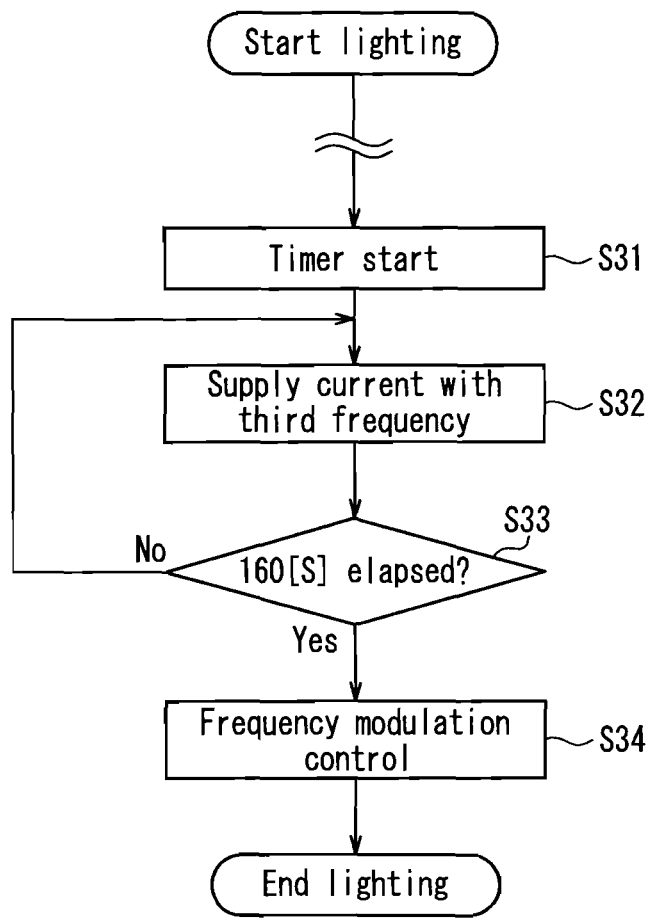
FIG. 10 is a flowchart showing a frequency control operation on an alternating current by a high-pressure discharge lamp lighting device included in Modified Example 2 of the high-pressure discharge lamp device.

By the way, the certain period from the completion of the starting operation during which an alternating current with the third frequency (170 Hz) is kept being supplied, in other words, a "modulation forbidden period" is not limited to "from the completion of the starting operation until a predetermined time before lighting is shifted to constant power lighting" described above. For example, as shown in FIG. 7, it may be "from the completion of the starting operation until lighting is shifted to constant power lighting. Or it may be "from the completion of the starting operation until a predetermined time after lighting has been shifted to constant power lighting", for example, 160 s from the completion of the starting operation as shown in FIG. 8. FIGS. 9 and 10 are flowcharts respectively showing the frequency control operations on an alternating current in the operation examples shown in FIGS. 7 and 8. Although the steps that relate to the starting operation are not shown in the figures, they are similar to those shown in FIG. 5. Hereinafter, these modified examples will be described in detail.

MODIFIED EXAMPLE 1

(3-2) Also in the operation examples shown in FIGS. 7 and 9, a transition to the low-frequency operation takes place after the completion of the starting operation described in the sections (1) and (2) above. The operation circuit 10 performs the constant current control (e.g., 3 A constant) until the lamp voltage rises and reaches a predetermined voltage (e.g., 60 V) along with evaporation of mercury Further, an alternating current to be supplied at this time is initially an alternating current with a frequency fixed to the third frequency lower than the second frequency (e.g., 340 Hz), for example, fixed to 170 Hz (step S21).

(4-2) Thereafter, unlike the operation examples shown in FIGS. 5 and 6 (description of section (3-1)), at the same time as a transition from the completion of the starting operation to the constant power control for keeping the lamp power constant takes place as the lamp voltage rises to a predetermined value (e.g., 60 V) as shown in FIG. 9 (step S22: YES), a transition to step S23 takes place. That is, an alternating current to be supplied is frequency modulated to the first frequency (e.g., 60 Hz) and the second frequency (e.g., 340 Hz) from the fixed value of the third frequency (170 Hz). Thereafter, the frequency modulation control is maintained until the light is turned off (lighting switch OFF). However, from the completion of the starting operation until the lamp voltage reaches a predetermined value (e.g., 60V), an alternating current with the third frequency (e.g., 170 Hz) is kept being supplied to the high-pressure mercury-vapor lamp 4.

MODIFIED EXAMPLE 2

(3-3) Also in the operation examples shown in FIGS. 8 and 10, a transition to the low-frequency operation takes place after the completion of the starting operation described in the sections (1) and (2) above. The operation circuit 10 performs the constant current control (e.g., 3 A constant) until the lamp voltage rises and reaches a predetermined voltage (e.g., 60 V) along with evaporation of mercury. At this time, as shown in FIG. 10, the timer 14 starts a count at the same time as the starting operation is completed (step S31) and an alternating current with a frequency fixed to the third frequency higher than the first frequency (e.g., 60 Hz) (described later) and lower than the second frequency (e.g., 340 Hz), for example, fixed to 170 Hz, is supplied to the high-pressure mercury-vapor lamp 4 (step S32). Although step 31 "timer start" is described ahead of step S32 "constant current control at third frequency" for the sake of convenience in illustration, practically, the operation is performed in a similar manner to the steps shown in FIG. 5.

Here, the timer setting time of the timer 14 is set to 160 s, for example. Unless the time counted by the timer elapses 160 s, an alternating current to be supplied will not be subjected to the frequency modulation control and is maintained at the third frequency (170 Hz) (step S33: NO). As shown in FIG. 8, the timer setting time of 160 s is set to a time from the completion of the starting operation (cold start) until a predetermined time after lighting has been shifted to constant power (180 W) lighting. When the timer setting time is set to "from the completion of the starting operation until a predetermined time after lighting has been shifted to constant power lighting", the "predetermined time" is preferably not too long in terms of properly growing and maintaining the protrusions 23 of the electrodes 19 as will be discussed later. For example, the upper limit is preferably 300 s or less from the completion of the starting operation.

(4-3) When the count by the timer 14 elapses 160 s (step S33: YES), an alternating current to be supplied is frequency modulated to the first frequency (e.g., 60 Hz) and the second frequency (e.g., 340 Hz) from the fixed value of the third frequency (170 Hz) (step S34). Thereafter, the frequency modulation control is maintained until the light is turned off (lighting switch OFF).

However, as shown in FIG. 8, when the lamp voltage rises and reaches a predetermined voltage value (e.g., 60 V), a transition to the constant power control for keeping the lamp power constant (180 W) takes place regardless of the count by the timer 14.

Here, the first frequency and the second frequency of alternating current are not limited to the examples mentioned above (including Modified Examples). In order to maintain the shape of the protrusions 23 of the electrodes 19 properly, the first frequency preferably is selected from the range of 20 Hz to 200 Hz and the second frequency preferably is selected from the range of 300 Hz to 1000 Hz. By setting the first frequency within the range mentioned above, the growth of the protrusions 23 is facilitated. Further, by setting the second frequency within the range mentioned above, the growth of the protrusions 23 is moderately retarded. And by switching the both frequencies, in other words, by performing frequency modulation, the balance between the facilitation and retardation of growth of the protrusions 23 is maintained properly and the shape of the protrusions 23 can be maintained for a long time.

Further, the third frequency of alternating current is also not limited to the example mentioned above (including Modified Examples), and is preferably selected from the range of 50 Hz to 200 Hz because of the reasons discussed later.

The high-pressure discharge lamp device 1 according to Embodiment 1 of the present invention includes the high-pressure discharge lamp lighting device 3 having the features as described above. Thus, it can exhibit the following effects.

That is, during the modulation forbidden period defined as a period (a) from the completion of the starting operation until a predetermined time before lighting is shifted to the constant power lighting, (b) from the completion of the starting operation until lighting is shifted to the constant power lighting or (c) from the completion of the starting operation until a predetermined time after lighting has been shifted to the constant power lighting, the frequency modulation control on an alternating current for properly growing and maintaining the protrusions 23 of the electrodes 19 is not performed. Thus, the production of noise can be suppressed. That is, when an alternating current includes the second frequency (340 Hz) fundamentally having high audibility, it could not only result in production of noise but also the noise evolves into an extremely harsh noise as the second frequency and the first frequency (60 Hz) having smaller audibility than the second frequency are repeated alternately and appear intermittently. According to the present embodiment, the occurrence of such a situation can be prevented.

Therefore, the quietness can be improved sufficiently. Besides, the frequency modulation control on an alternating current during this period does not particularly contribute to control on the protrusions 23. Thus, there is no adverse impact on the effect that the protrusions 23 produce. And by performing the frequency modulation control on an alternating current after a lapse of these modulation forbidden periods, the protrusions 23 can be grown and maintained properly. As a result, the occurrence of flicker caused by movements of the arc cathode spots can be prevented and a decline in emitted light from the reflection mirror 26 due to the arc deviating from an initial position can also be suppressed.

Figure 11:
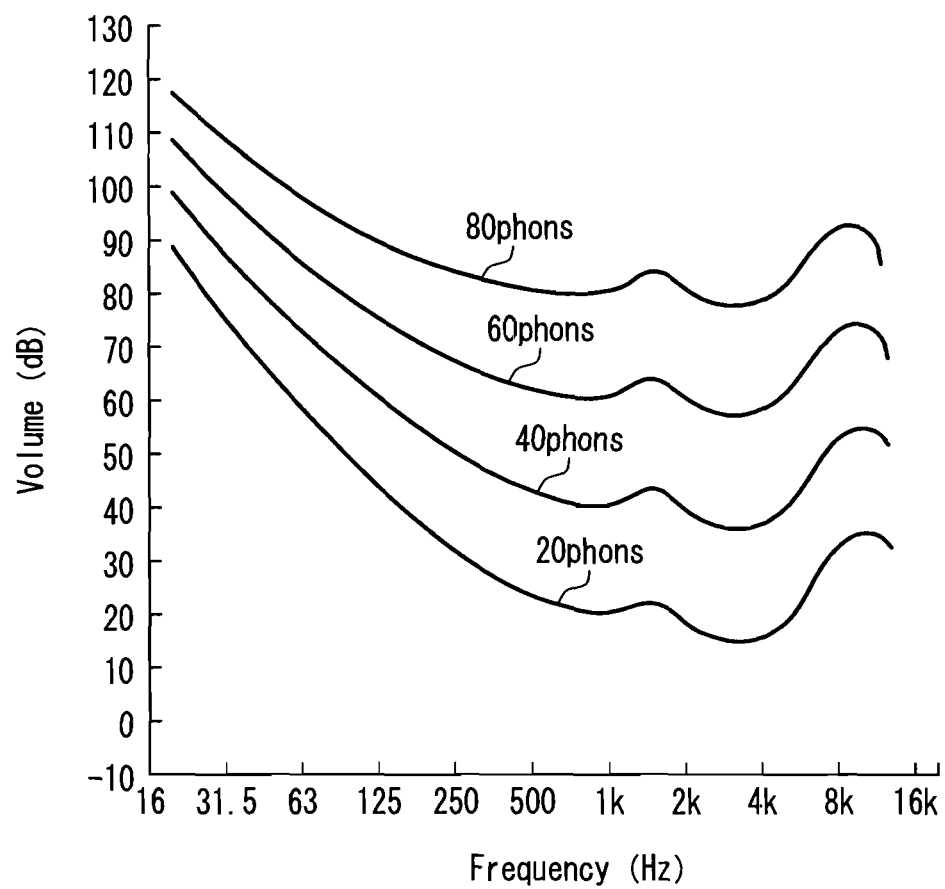
FIG. 11 is a diagram showing equal-loudness contours.

Here, the third frequency of alternating current preferably is selected from the range of 50 Hz to 200 Hz, in which the production of noise can be suppressed sufficiently and the protrusions 23 do not deform or disappear by evaporation. That is, high and low values of audibility can be determined on the basis of the equal-loudness contours shown in FIG. 11 or an index defined by ISO226, for example. As a result of performing an evaluation with actual test subjects along with making reference to the indexes, the present inventors have discovered that the third frequency is desirably set to 200 Hz or less as a preferred example.

According to the equal-loudness contours, the audibility becomes smaller as the third frequency becomes lower. Meanwhile, as the lamp current value during the constant current control after the completion of the starting operation becomes larger than the lamp current value during the constant power control, the temperature of the electrodes 19 rises excessively. When the third frequency as the fixed frequency is too low in this state, the temperature of the electrodes 19 rises extremely and the protrusions 23 may deform or disappear by evaporation. For this problem, by setting the third frequency to 50 Hz or more as a preferred example during the period in which the frequency modulation control is not performed on an alternating current, an extreme rise in the temperature of the electrodes 19 can be suppressed and deformation or disappearance of the protrusions 23 by evaporation can be prevented with certainty.

(Embodiment 2)

Essentially, a lighting device and a high-pressure mercury-vapor lamp in a high-pressure discharge lamp device according to Embodiment 2 of the present invention are configured similarly to those in Embodiment 1 shown in FIGS. 1 and 2.

One of the features of the high-pressure discharge lamp device according to the present embodiment is that when the lamp voltage of the high-pressure mercury-vapor lamp 4 falls below a certain value after a lapse of a certain period from the completion of the starting operation (modulation forbidden period), the frequency modulation control on alternating current is not performed and an alternating current with a fourth frequency selected from the range of 300 Hz to 1000 Hz is supplied. The "modulation forbidden period" is defined as a period of any of the following: (a) from the completion of the starting operation until a predetermined time before lighting is shifted to the constant power lighting; (b) from the completion of the starting operation until lighting is shifted to the constant power lighting; and (c) from the completion of the starting operation until a predetermined time after lighting has been shifted to the constant power lighting.

Other than that, the high-pressure discharge lamp device is configured similarly to that according to Embodiment 1 described above. Thus, hereinafter the differences mainly will be described in detail and the description of other aspects will not be repeated.

Figure 12:
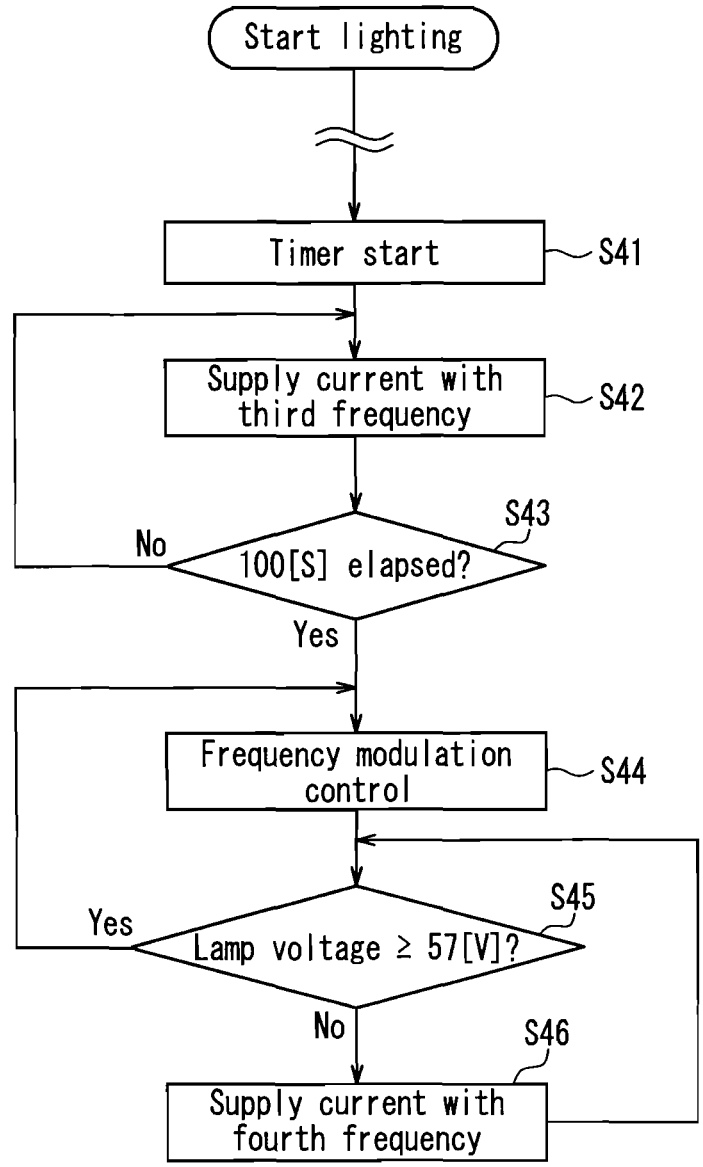
FIG. 12 is a flowchart showing a frequency control operation on an alternating current by a high-pressure discharge lamp lighting device included in a high-pressure discharge lamp device according to Embodiment 2 of the present invention.

The operation of the high-pressure discharge lamp lighting device according to the present embodiment will be described with reference to FIGS. 1, 2 and the flowchart of FIG. 12. FIG. 12 is a flowchart showing a frequency control operation on an alternating current in the high-pressure discharge lamp lighting device 3. Although the steps that relate to the starting operation are not shown in the figure, they are similar to those shown in FIG. 5. Further, although "timer start" is described ahead of "constant current control at third frequency" for the sake of convenience in illustration, practically, the operation is performed in a similar manner to the steps shown in FIG. 5. (hereinafter, the same holds true for other flowcharts described later).

(1) First, when a lighting switch (not shown) for lighting the high-pressure mercury-vapor lamp 4 is turned on, the high voltage generator 7 applies a high frequency high voltage (e.g., 3 kV, 100 kHz) to the high-pressure mercury-vapor lamp 4.

(2) When an electrical breakdown occurs between the electrodes 19 in the high-pressure mercury-vapor lamp 4, an arc discharge current starts to flow between the electrodes 19. Following the electrode warm-up period of about 2 s by the high-frequency operation, the starting operation is completed.

(3-1) After the completion of the starting operation, a transition to the low-frequency operation takes place. The control circuit 10 performs the constant current control (e.g., constant 3 A) until the lamp voltage rises and reaches a predetermined voltage (e.g., 60V) along with evaporation of mercury. Meanwhile, the lighting discrimination circuit 13 performs "lighting detection" based on a lamp current detection signal from the lamp current detector 8 and determines whether it is "after the completion of the starting operation" or not. And as shown in FIG. 12, in response to the "lighting detection", the timer 14 starts a count at the same time as the transition to the low-frequency operation takes place (step S41) and an alternating current with a frequency fixed to the third frequency lower than the second frequency (e.g., 340 Hz, described later), for example, fixed to 170 Hz, is supplied to the high-pressure mercury-vapor lamp 4 (step S42).

Here, the timer setting time of the timer 14 is set to 100 s, for example. Thus, unless the timer setting time elapses 100 s, an alternating current to be supplied will not be subjected to the frequency modulation control (described later) and is maintained at the third frequency (170 Hz) (step S43: NO). The timer setting time of 100 s is set to a time from the completion of the starting operation (cold start) until a predetermined time before lighting is shifted to constant power (180 W) lighting. Also in the present embodiment, when the timer setting time is set to "from the completion of the starting operation until a predetermined time before lighting is shifted to constant power lighting", the "predetermined time" is preferably longer in terms of achieving the quietness as much as possible and the lower limit is preferably 60 s or more from the completion of the starting operation, for example.

(4-1) When the count by the timer 14 elapses 100 s (step S43: YES), an alternating current to be supplied is frequency modulated to the first frequency (e.g., 60 Hz) and the second frequency (e.g., 340 Hz) from the fixed value of the third frequency (170 Hz) (step S44). Thereafter, unless the lamp voltage of the high-pressure mercury-vapor lamp 4 falls below a certain value (e.g., 57 V) (step S45: YES), the modulation control is maintained until the light is turned off (lighting switch OFF).

Meanwhile, the lamp voltage subsequently could fall below the certain value (e.g., 57 V) (step S45: NO) when the protrusions 23 of the high-pressure mercury-vapor lamp 4 have grown excessively and the distance between the electrodes has become small. In that case, the frequency modulation control on an alternating current is stopped and the frequency of an alternating current is switched to and maintained at the fourth frequency (e.g., 390 Hz) selected from the range of 300 Hz to 1000 Hz (step S46). Thereafter, when the lamp voltage goes above the certain value (57V) (step S45: YES), an alternating current is again frequency modulated to the first frequency (60 Hz) and the second frequency (340 Hz) from the fixed value of the fourth frequency (390 Hz) (step S44). Note that 57V used as the certain value of the lamp voltage in this case is set practically to 60V, of which hysteresis is set to, for example, 3V to stabilize the circuit operation.

However, when the lamp voltage rises and reaches a predetermined voltage value (e.g., 60 V), a transition to the constant power control for keeping the lamp power constant (180 W) takes place regardless of the count by the timer 14.

Figure 13:
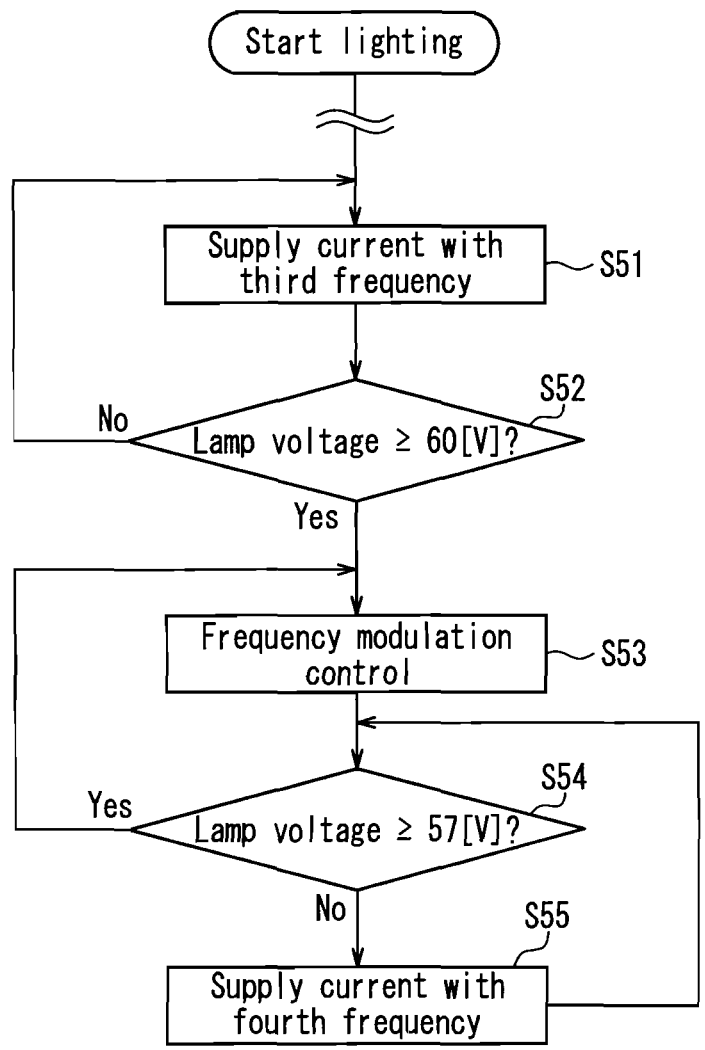
FIG. 13 is a flowchart showing a frequency control operation on an alternating current by a high-pressure discharge lamp lighting device included in Modified Example 3 of the high-pressure discharge lamp device.
Figure 14:
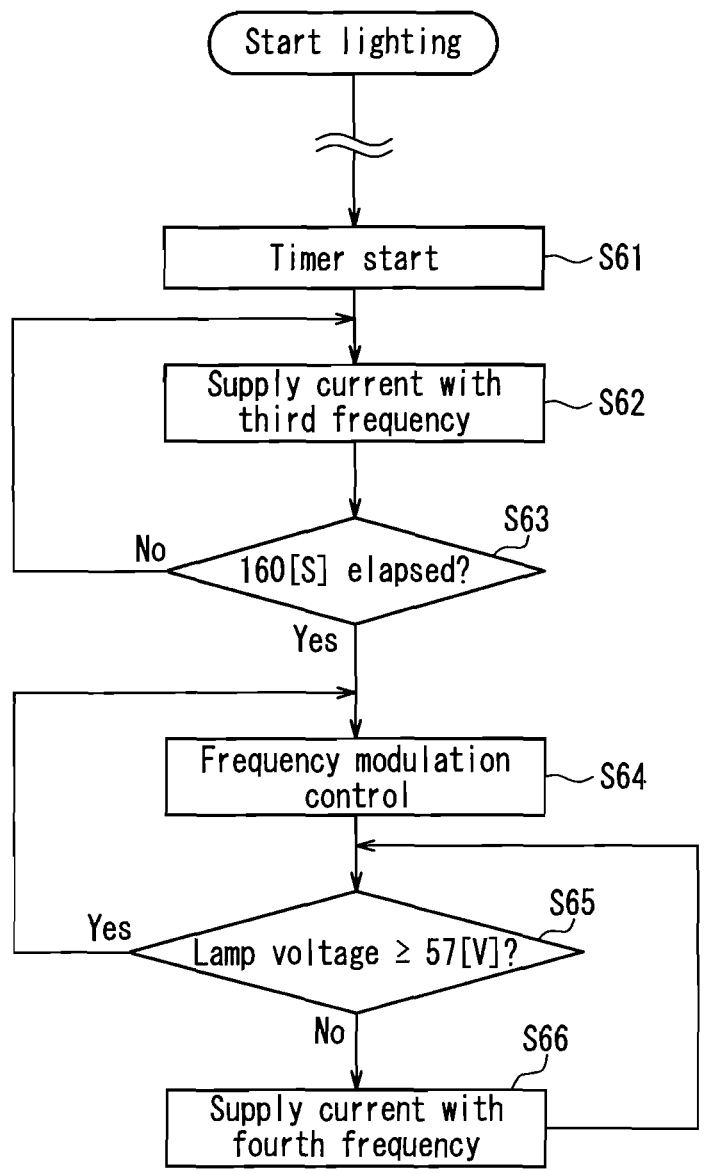
FIG. 14 is a flowchart showing a frequency control operation on an alternating current by a high-pressure discharge lamp lighting device included in Modified Example 4 of the high-pressure discharge lamp device.

Similarly to the high-pressure discharge lamp device according to Embodiment 1 described above, also in the high-pressure discharge lamp device according to Embodiment 2 of the present invention, the certain period from the completion of the starting operation (modulation forbidden period) during which the frequency of an alternating current to be supplied is maintained at the third frequency (170 Hz) is not limited to "(a) from the completion of the starting operation until a predetermined time before lighting is shifted to the constant power lighting" described above. That is, as shown in FIG. 13, it may be "(b) from the completion of the starting operation until lighting is shifted to the constant power lighting". Or it may be "(c) from the completion of the starting operation until a predetermined time after lighting has been shifted to the constant power lighting" as shown in FIG. 14. The details of these modified examples are as follows.

MODIFIED EXAMPLE 3

(3-2) Also in the operation example shown in FIG. 13, a transition to the low-frequency operation takes place after the completion of the starting operation described in the sections (1) and (2) above. The operation circuit 10 performs the constant current control (e.g., 3 A constant) until the lamp voltage rises and reaches a predetermined voltage (e.g., 60 V) along with evaporation of mercury. Further, an alternating current to be supplied at this time is an alternating current with a frequency fixed to the third frequency lower than the second frequency (e.g., 340 Hz, described later), for example, fixed to 170 Hz (step S51).

(4-2) Thereafter, unlike the operation example shown in FIG. 12 (section (3-1)), at the same time as a transition from the completion of the starting operation to the constant power control for keeping the lamp power constant takes place as the lamp voltage rises to a predetermined value (e.g., 60 V) as shown in FIG. 13 (step S52: YES), a transition to step S53 takes place. That is, an alternating current to be supplied is frequency modulated to the first frequency (e.g., 60 Hz) and the second frequency (e.g., 340 Hz) from the fixed value of the third frequency (e.g., 170 Hz). Thereafter, unless the lamp voltage of the high-pressure mercury-vapor lamp 4 falls below a certain value (e.g., 57V) (step S54: YES), the modulation control is maintained until the light is turned off (lighting switch OFF).

Meanwhile, the lamp voltage subsequently could fall below the certain value (e.g., 57 V) (step S54: NO) when the protrusions 23 of the high-pressure mercury-vapor lamp 4 have grown excessively and the distance between the electrodes has become small. In that case, the frequency modulation control on an alternating current is stopped and the frequency of an alternating current is switched to and maintained at the fourth frequency (e.g., 390 Hz) selected from the range of 300 Hz to 1000 Hz (step S55). Thereafter, when the lamp voltage goes above the certain value (57V) (step S54: YES), an alternating current is again frequency modulated to the first frequency (60 Hz) and the second frequency (340 Hz) from the fixed value of the fourth frequency (390 Hz) (step S53). Note that 57V used as the certain value of the lamp voltage in this case is set practically to 60V, of which hysteresis is set to, for example, 3V to stabilize the circuit operation.

However, from the completion of the starting operation until the lamp voltage reaches a predetermined value (e.g., 60V), an alternating current with the third frequency (e.g., 170 Hz) is kept being supplied to the high-pressure mercury-vapor lamp 4.

MODIFIED EXAMPLE 4

(3-3) Also in the operation example shown in FIG. 14, a transition to the low-frequency operation takes place after the completion of the starting operation described in the sections (1) and (2) above. The operation circuit 10 performs the constant current control (e.g., 3 A constant) until the lamp voltage rises and reaches a predetermined voltage (e.g., 60 V) along with evaporation of mercury. At this time, as shown in FIG. 14, the timer 14 starts a count at the same time as the transition to the low-frequency operation takes place (step S61) and an alternating current with a frequency fixed to the third frequency lower than the second frequency (e.g., 340 Hz, described later), for example, fixed to 170 Hz, is supplied to the high-pressure mercury-vapor lamp 4 (step S62).

Here, the timer setting time of the timer 14 is set to 160 s, for example. Unless the time counted by the timer elapses 160 s, an alternating current to be supplied will not be subjected to the frequency modulation control (described later) and is maintained at the third frequency (170 Hz) (step S63: NO). The tinier setting time of 160 s is set to a time from the completion of the starting operation (cold start) until a predetermined time after lighting has been shifted to constant power (180 W) lighting. Also in this example, when the timer setting time is set to "from the completion of the starting operation until a predetermined time after lighting has been shifted to the constant power lighting", the "predetermined time" is preferably not too long in terms of properly growing and maintaining the protrusions 23 of the electrodes 19 as will be discussed later. For example, the upper limit is preferably 300 s or less from the completion of the starting operation.

(4-3) When the count by the timer 14 elapses 160 s (step S63: YES), an alternating current to be supplied is frequency modulated to the first frequency (e.g., 60 Hz) and the second frequency (e.g., 340 Hz) from the fixed value of the third frequency (170 Hz) (step S64). Thereafter, unless the lamp voltage of the high-pressure mercury-vapor lamp 4 falls below a certain value (e.g., 57 V) (step S65: YES), the modulation control is maintained until the light is turned off (lighting switch OFF).

Meanwhile, the lamp voltage subsequently could fall below the certain value (e.g., 57 V) (step S65: NO) when the protrusions 23 of the high-pressure mercury-vapor lamp 4 have grown excessively and the distance between the electrodes has become small. In that case, the frequency modulation control on an alternating current is stopped and the frequency of an alternating current is switched to and maintained at the fourth frequency (e.g., 390 Hz) selected from the range of 300 Hz to 1000 Hz (step S66). Thereafter, when the lamp voltage goes above the certain value (57V) (step S65: YES), an alternating current is again frequency modulated to the first frequency (60 Hz) and the second frequency (340 Hz) from the fixed value of the fourth frequency (390 Hz) (step S64). Note that 57V used as the certain value of the lamp voltage in this case is set practically to 60V, of which hysteresis is set to, for example, 3V to stabilize the circuit operation.

However, when the lamp voltage rises and reaches a predetermined voltage value (e.g., 60 V), a transition to the constant power control for keeping the lamp power constant (180 W) takes place regardless of the count by the timer 14.

Here, the first frequency and the second frequency of alternating current are not limited to the examples mentioned above (including Modified Examples). That is, in order to properly maintain the shape of the protrusions 23 of the electrodes 19, the first frequency is preferably selected from the range of 20 Hz to 200 Hz and the second frequency is preferably selected from the range of 300 Hz to 1000 Hz. By setting the first frequency within the range mentioned above, the growth of the protrusions 23 is facilitated. Further, by setting the second frequency within the range mentioned above, the growth of the protrusions 23 is moderately retarded. Thus, by switching the both frequencies, in other words, by performing frequency modulation, the balance between the facilitation and retardation of growth of the protrusions 23 is properly maintained and the shape of the protrusions 23 can be maintained for a long time.

Further, the third frequency of alternating current is also not limited to the example mentioned above (including Modified Examples), and is preferably selected from the range of 50 Hz to 200 Hz.

Further, the specific lamp voltage value of the high-pressure mercury-vapor lamp 4 for detecting the timing to stop the frequency modulation control on an alternating current and change the frequency of alternating current to the fourth frequency selected from the range of 300 Hz to 1000 Hz is not limited to 57V. Further, the voltage for detecting the timing to resume the modulation operation is also not limited to 60V and is set appropriately in accordance with various specifications of the high-pressure mercury-vapor lamp 4 such as constant power.

The high-pressure discharge lamp device according to Embodiment 2 of the present invention includes the high-pressure discharge lamp lighting device having the features as described above. Thus, similarly to the high-pressure discharge lamp device according Embodiment 1, it can exert the following effects.

That is, (a) from the completion of the starting operation until a predetermined time before lighting is shifted to the constant power lighting, (b) from the completion of the starting operation until lighting is shifted to the constant power lighting or (c) from the completion of the starting operation until a predetermined time after lighting has been shifted to the constant power lighting as the modulation forbidden period, the frequency modulation control on an alternating current for properly growing and maintaining the protrusions 23 of the electrodes 19 is not performed. Thus, the production of noise can be suppressed. That is, when an alternating current includes the second frequency (340 Hz) fundamentally having high audibility, it could not only result in the production of noise but also the noise evolves into an extremely harsh noise as the second frequency and the first frequency (60 Hz) having smaller audibility than the second frequency are repeated alternately and appear intermittently. The occurrence of such a situation can be avoided because of the above-described configuration.

Therefore, the quietness can be improved sufficiently. Besides, the frequency modulation control on an alternating current during this period does not particularly contribute to control on the protrusions 23. Thus, there is no adverse impact on the effect that the protrusions 23 produce. And by performing the frequency modulation control on an alternating current after a lapse of these modulation forbidden periods, the protrusions 23 can be grown and maintained properly. As a result, the occurrence of flicker caused by movements of the arc cathode spots can be prevented and a decline in emitted light from the reflection mirror 26 due to the arc deviating from an initial position can also be suppressed.

Furthermore, according to the present embodiment, the following effects can also be achieved. That is, during an initial stage of the cumulative lighting time (e.g., within 500 hours), the halogen cycle effect actively functions. In this stage, when the ambient temperature of the high-pressure mercury-vapor lamp 4 changes due to an environmental change of some kind, the protrusions 23 of the electrodes 19 grow excessively, causing the distance L between the electrodes 19 to be smaller than a desired range. As a result, the high-pressure mercury-vapor lamp 4 may fall into a low voltage state where the lamp voltage becomes smaller than a desired value frequently or for a long time.

According to the present embodiment, when the high-pressure mercury-vapor lamp 4 falls into the low voltage state such as the lamp voltage falling below a certain value (e.g., 57V), an alternating current with the fourth frequency (e.g., 390 Hz) selected from the range of 300 Hz to 1000 Hz is supplied. Consequently, the growth of the protrusions 23 of the electrodes 19 can be retarded.

Although 390 Hz is adopted as the fourth frequency of alternating current, this value is determined by the specifications of the high-pressure mercury-vapor lamp 4 and is experimentally derived. As long as the value is selected from the range of the derived value to 1000 Hz, a similar effect to the above-mentioned can be achieved. Within the specification range of the high-pressure mercury-vapor lamp 4 that is assumed by the present invention and has been described in Embodiment 1, the frequency range considered to be adequate for the fourth frequency is 300 Hz to 1000 Hz.

Here, the difference between the second and fourth frequencies of alternating current will be described. The frequency range considered to be adequate for the both frequencies is the same, that is, 300 Hz to 1000 Hz. However, the values actually determined for the two frequencies are different as the intended effects by the respective frequencies are different. As described above, on one hand, the second frequency is for moderately retarding the growth of the protrusions 23. On the other hand, the fourth frequency is for retarding the growth of the protrusions 23. Therefore, the growth of the protrusions 23 needs to be retarded further by the fourth frequency than the second frequency. Thus, relatively speaking, as for the values actually determined to achieve each of the effects with certainty, the value of the fourth frequency becomes higher than that of the second frequency. The fourth frequency preferably is set to be higher than the second frequency by 10 Hz or more.

Further, as described above, in order to suppress the production of noise sufficiently and to prevent deformation or disappearance by evaporation of the protrusions 23 with certainty, the third frequency of alternating current preferably is selected from the range of 50 Hz to 200 Hz.

(Embodiment 3)

Essentially, a lighting device and a high-pressure mercury-vapor lamp in a high-pressure discharge lamp device according to Embodiment 3 of the present invention are configured similarly to those in Embodiment 1 shown in FIGS. 1 and 2.

One of the features of the high-pressure discharge lamp device according to the present embodiment is that an alternating current is modulated to at least the first frequency and the second frequency having higher audibility than the first frequency except during a certain period from the completion of the starting operation (modulation forbidden period), and during a predetermined time selected from the range of 60 s to 300 s from the completion of the starting operation set as the modulation forbidden period, the frequency modulation control on an alternating current is not performed and an alternating current is maintained at the third frequency lower than the second frequency.

Other than that, the high-pressure discharge lamp device is configured in the same manner as that according to Embodiment 1 described above. Thus, hereinafter the differences mainly will be described in detail and the description of other aspects will not be repeated.

Figure 15:
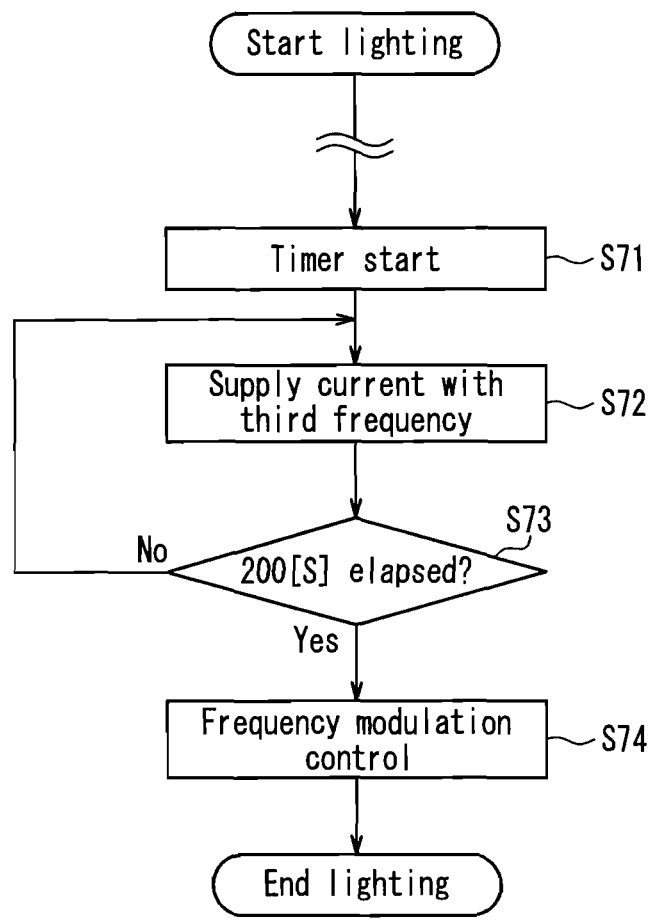
FIG. 15 is a flowchart showing a frequency control operation on an alternating current by a high-pressure discharge lamp lighting device included in a high-pressure discharge lamp device according to Embodiment 3 of the present invention.

The operation of the high-pressure discharge lamp lighting device according to the present embodiment will be described with reference to FIGS. 1, 2 and the flowchart of FIG. 15. FIG. 15 is a flowchart showing a frequency control operation on an alternating current in the high-pressure discharge lamp lighting device.

(1) First, when a lighting switch (not shown) for lighting the high-pressure mercury-vapor lamp 4 is turned on, the high voltage generator 7 applies a high frequency high voltage (e.g., 3 kV, 100 kHz) to the high-pressure mercury-vapor lamp 4.

(2) When an electrical breakdown occurs between the electrodes 19 in the high-pressure mercury-vapor lamp 4, an arc discharge current starts to flow between the electrodes 19. Following the electrode warm-up period of about 2 s by the high-frequency operation, the starting operation is completed.

(3) After the completion of the starting operation, a transition to the low-frequency operation takes place. The control circuit 10 performs the constant current control (e.g., constant 3 A) until the lamp voltage rises and reaches a predetermined voltage (e.g., 60V) along with evaporation of mercury. Meanwhile, the lighting discrimination circuit 13 performs "lighting detection" based on a lamp current detection signal from the lamp current detector 8 and determines whether it is "after the completion of the starting operation" or not. And as shown in FIG. 15, in response to the "lighting detection", the timer 14 starts a count at the same time as the transition to the low-frequency operation takes place (step S71) and an alternating current with a frequency fixed to the third frequency lower than the second frequency (e.g., 340 Hz, described later), for example, fixed to 170 Hz, is supplied to the high-pressure mercury-vapor lamp 4 (step S72). Here, the timer setting time of the timer 14 is set to 200 s, for example. Thus, unless the timer setting time elapses 200 s, an alternating current to be supplied will not be subjected to the frequency modulation control (described later) and is maintained at the third frequency (170 Hz) (step S73: NO).

(4) When the count by the timer 14 elapses 200 s (step S73: YES), an alternating current to be supplied is frequency modulated to the first frequency (e.g., 60 Hz) and the second frequency (e.g., 340 Hz) from the fixed value of the third frequency (170 Hz) (step S74). Thereafter, the modulation control is maintained until the light is turned off (lighting switch OFF).

However, when the lamp voltage rises and reaches a predetermined voltage value (e.g., 60 V), a transition to the constant power control for keeping the lamp power constant (180 W) takes place regardless of the count by the timer 14.

As described above, during the certain period from the completion of the starting operation, the frequency modulation control on an alternating current is not performed and the frequency of alternating current is maintained at the third frequency (170 Hz) lower than the second frequency (340 Hz). Thus, the time counted by the timer 14 is set to 200 s, for example. The count time can be selected from the range of 60 s to 300 s from the completion of the starting operation. It has been found from the accumulation of experiments that when the count time is within this range, the effects to be discussed later can be achieved regardless of various specifications of the high-pressure mercury-vapor lamp 4, such as the distance L between the electrodes 19, the amount of mercury with which the lamp is filled and the dimensions of the electrodes 19.

Further, the first frequency and the second frequency of alternating current are not limited to the example mentioned above. In order properly to maintain the shape of the protrusions 23 of the electrodes 19, the first frequency is preferably selected from the range of 20 Hz to 200 Hz and the second frequency is preferably selected from the range of 300 Hz to 1000 Hz. By setting the first frequency within the range mentioned above, the growth of the protrusions 23 is facilitated. Further, by setting the second frequency within the range mentioned above, the growth of the protrusions 23 is retarded moderately. Thus, by switching the both frequencies, in other words, by performing frequency modulation, the balance between the facilitation and retardation of growth of the protrusions 23 is maintained properly and the shape of the protrusions 23 can be maintained for a long time.

Further, the third frequency of alternating current also is not limited to the example mentioned above and preferably is selected from the range of 50 Hz to 200 Hz because of the reasons described later.

Figure 16:
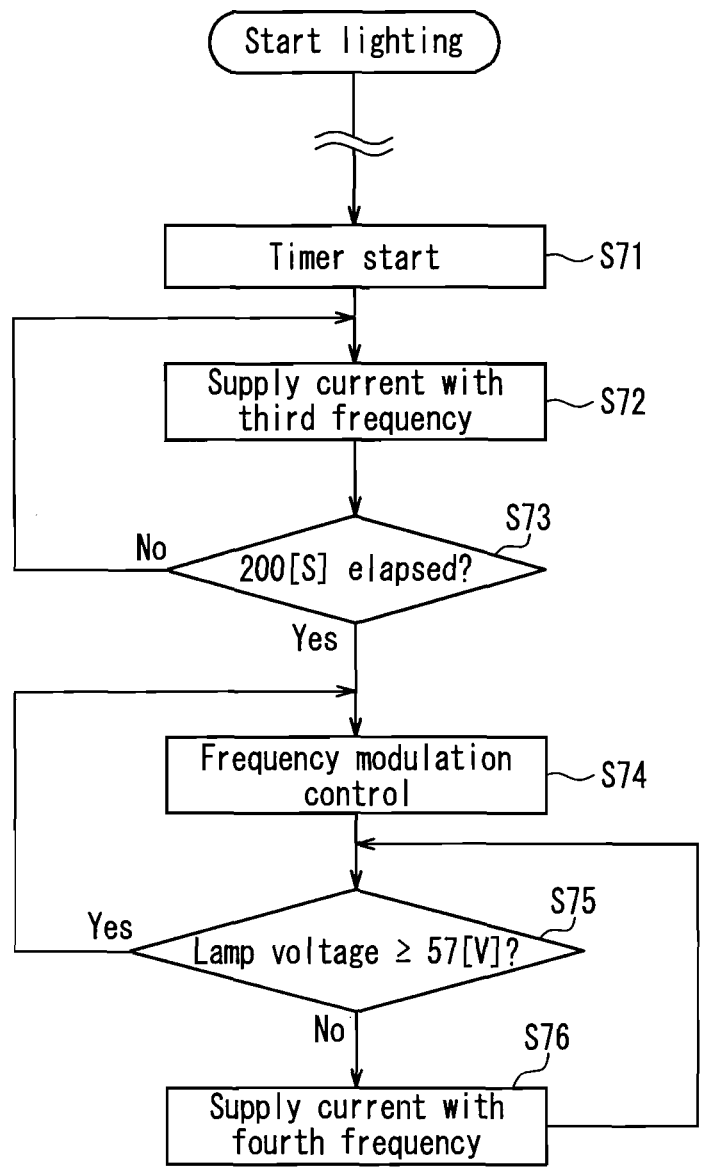
FIG. 16 is a flowchart showing a frequency control operation on an alternating current by a high-pressure discharge lamp lighting device included in a modified example of the high-pressure discharge lamp device.

Further, in the above-described operation example, after the control on an alternating current has been changed to the frequency modulation control, the modulation control is maintained without depending on the lamp voltage of the high-pressure mercury-vapor lamp 4. As shown in FIG. 16, the operations at steps S75 and S76 may be added to the operation example as a modified example.

That is, the following operations may be added. When the lamp voltage of the high-pressure mercury-vapor lamp 4 falls below a certain value (e.g., 57V) after a lapse of the modulation forbidden period (step S75: NO), the frequency modulation control on an alternating current is stopped and the frequency of an alternating current is switched to and maintained at the fourth frequency (e.g., 390 Hz) selected from the range of 300 Hz to 1000 Hz (step S76). Thereafter, when the lamp voltage goes above the certain value (57V) (step S75: YES), the alternating current is again frequency modulated to the first frequency (60 Hz) and the second frequency (340 Hz) from the fixed value of the fourth frequency (390 Hz) (step S74). Note that 57V used as the certain value of the lamp voltage in this case is set practically to 60V, of which hysteresis is set to, for example, 3V to stabilize the circuit operation.

Consequently, similarly to the high-pressure discharge lamp device according to Embodiment 2 described above, even when the lamp voltage of the high-pressure mercury-vapor lamp 4 falls below a certain value (e.g., 57V), it is possible to prevent deformation or disappearance by evaporation of the protrusions 23 due to an extreme rise in the temperature of the electrodes 19. In that case, the fourth frequency of alternating current is not limited to the example described above. Even when the fourth frequency is selected from the range of 300 Hz to 1000 Hz, similar effects can be achieved. However, because of the reasons described above, the fourth frequency is preferably higher than the second frequency by 10 Hz or more.

The high-pressure discharge lamp device according to Embodiment 3 of the present invention includes the high-pressure discharge lamp lighting device having the features as described above. Thus, similarly to the high-pressure discharge lamp device according Embodiment 1, it can exert the following effects.

That is, during the predetermined time selected from the range of 60 s to 300 s from the completion of the starting operation, the frequency modulation control on an alternating current for properly growing and maintaining the protrusions 23 of the electrodes 19 is not performed. Thus, the production of noise can be suppressed. That is, when an alternating current includes the second frequency (340 Hz) fundamentally having high audibility, it could not only result in the production of noise but also the noise evolves into an extremely harsh noise as the second frequency and the first frequency (60 Hz) are repeated alternately and appear intermittently. According to the present embodiment, the occurrence of such a situation can be prevented.

Therefore, the quietness can be improved. Besides, the frequency modulation control on an alternating current during this period does not particularly contribute to control on the protrusions 23. Thus, there is no adverse impact on the effect that the protrusions 23 produce.

And by performing the frequency modulation control on an alternating current after a lapse of the modulation forbidden period, the protrusions 23 can be grown and maintained properly. As a result, the occurrence of flicker caused by movements of the arc cathode spots can be prevented and a decline in emitted light from the reflection mirror 26 due to the arc deviating from an initial position also can be suppressed.

Here, as described above, in order to suppress the production of noise sufficiently and to prevent deformation or disappearance by evaporation of the protrusions 23 with certainty, the third frequency of alternating current is preferably selected from the range of 50 Hz to 200 Hz.

(Embodiment 4)

A high-pressure discharge lamp device according to Embodiment 4 of the present invention is configured in the same manner as the high-pressure discharge lamp device according to Embodiment 1 described above except that the lighting device operates differently. Thus, hereinafter the differences (operation examples) mainly will be described in detail and the description of other aspects will not be repeated.

Figure 17:
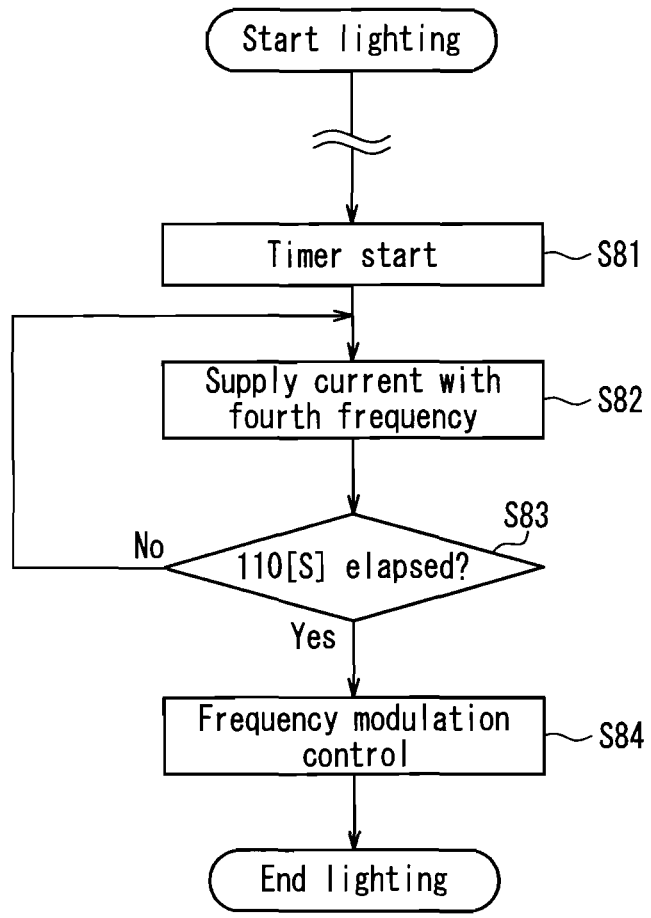
FIG. 17 is a flowchart showing a frequency control operation on an alternating current by a high-pressure discharge lamp lighting device included in a high-pressure discharge lamp device according to Embodiment 4 of the present invention.

The operation of the high-pressure discharge lamp lighting device according to the present embodiment will be described with reference to FIGS. 1, 2 and the flowchart of FIG. 17. FIG. 17 is a flowchart showing a frequency control operation on an alternating current in the high-pressure discharge lamp lighting device.

(1) First, when a lighting switch (not shown) for lighting the high-pressure mercury-vapor lamp 4 is turned on, the high voltage generator 7 applies a high frequency high voltage (e.g., 3 kV, 100 kHz) to the high-pressure mercury-vapor lamp 4.

(2) When an electrical breakdown occurs between the electrodes 19 in the high-pressure mercury-vapor lamp 4, an arc discharge current starts to flow between the electrodes 19. Following the electrode warm-up period of about 2 s by the high-frequency operation, the starting operation is completed.

(3-1) After the completion of the starting operation, a transition to the low-frequency operation takes place. The control circuit 10 performs the constant current control (e.g., constant 3 A) until the lamp voltage rises and reaches a predetermined voltage (e.g., 60V) along with evaporation of mercury. Meanwhile, the lighting discrimination circuit 13 performs "lighting detection" based on a lamp current detection signal from the lamp current detector 8 and determines whether it is "after the completion of the starting operation" or not. And as shown in FIG. 17, the timer 14 starts a count at the same time as the transition to the low-frequency operation takes place (step S81) and an alternating current with a frequency fixed to the fourth frequency selected from the range of 50 Hz to 200 Hz, for example, fixed to 170 Hz (alternating current with the fourth frequency), is supplied to the high-pressure mercury-vapor lamp 4 (step S82).

Here, the timer setting time of the timer 14 is set to 110 s, for example. Thus, unless the timer setting time elapses 110 s, an alternating current with the fourth frequency (170 Hz) is kept being supplied (step S83: NO). The timer setting time of 110 s is set to a time from the completion of the starting operation (cold start) until a predetermined time before lighting is shifted to constant power (180 W) lighting. Also in the present embodiment, when the timer setting time is set to "from the completion of the starting operation until a predetermined time before lighting is shifted to constant power lighting", the "predetermined time" is preferably longer in terms of achieving the quietness as much as possible. The lower limit is preferably 60 s or more from the completion of the starting operation, for example.

However, the time from the completion of the starting operation until lighting is shifted to the constant power (180 W) lighting is a unique value determined by the specifications of the high-pressure mercury-vapor lamp 4 to be used and is determined from the accumulation of experiments. Here, the time is 120 s. Although, practically, the time may vary depending on the individual high-pressure mercury-vapor lamps 4, and depending on a variety of conditions such as employing hot start, the time from the completion of the starting operation until lighting is shifted to the constant power lighting may vary. However, the variations are not significant and have no impact on the effects described later.

(4-1) When the count by the timer 14 elapses 110 s (step S83: YES), an alternating current to be supplied is switched from an alternating current with the fourth frequency (170 Hz) to an alternating current subjected to the frequency modulation control (step S84). Thereafter, the alternating current is kept being supplied until the light is turned off (lighting switch OFF). Meanwhile, when the lamp voltage rises and reaches a predetermined voltage value (e.g., 60V), a transition to the constant power control for keeping the lamp power constant (180 W) takes place regardless of the count by the timer 14. That is, the control circuit 10 uses the microcomputer 11 to calculate the lamp power based on a current value detected by the lamp current detector 8 and a voltage value detected by the lamp voltage detector 9, and controls an output current of the DC/DC converter 5 by sending a PWM control signal to the DC/DC converter 5 to keep the power constant.

Figure 18:
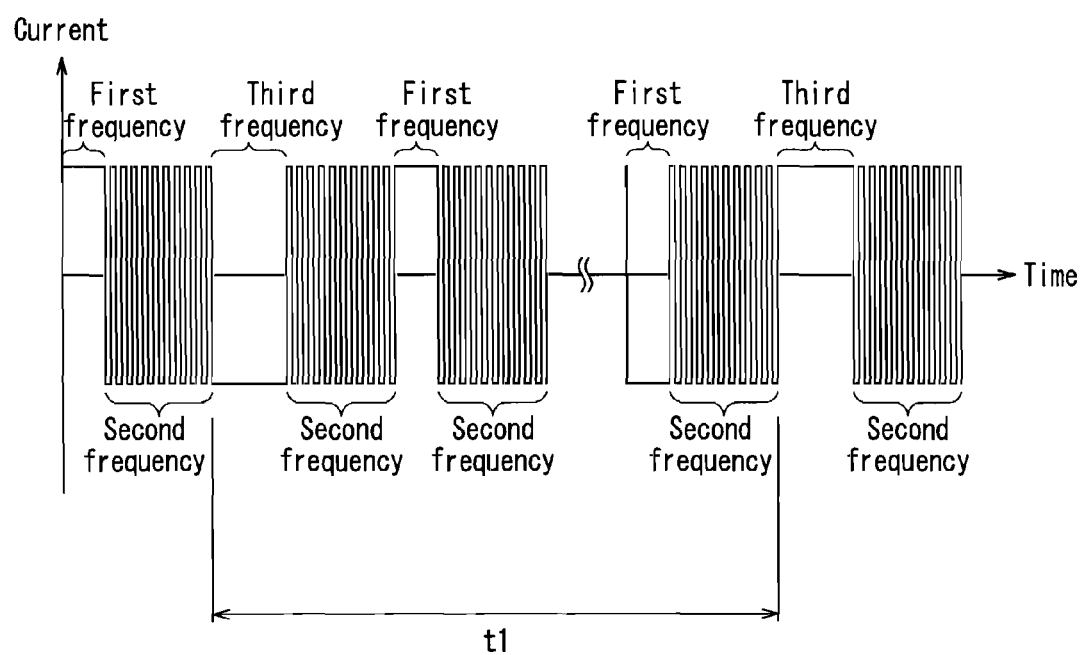
FIG. 18 is a diagram showing an example of waveform of an alternating current supplied to a high-pressure mercury-vapor lamp in the high-pressure discharge lamp device.

Here, the alternating current subjected to the frequency modulation control at step S84 has a waveform as follows. As shown in FIG. 18, alternating currents with the first frequency and the second frequency are switched every time each current is inputted for predetermined cycles and an alternating current with the third frequency is inputted for predetermined cycles by interrupting the cycle of current with the second frequency. The first frequency is selected from the range of 20 Hz to 200 Hz. The second frequency is selected from the range of 300 Hz to 1000 Hz. The third frequency is lower than the first frequency and is selected from the range of 5 Hz to 150 Hz. The current with the third frequency does not interrupt every time the cycle of current with the second frequency is inputted. Rather, it is set to interrupt at predetermined intervals.

As for the current with the first frequency, its input cycles are in the range of 0.5 cycles to 10 cycles per input. As for the current with the second frequency, its input cycles are in the range of 2 cycles to 200 cycles per input. Further, as for the current with the third frequency, its input cycles are in the range of 0.5 cycles to 150 cycles per input. A time interval $t_1$ at which the current with the third frequency interrupts the current with the second frequency is in the range of 130 s to 300 s. However, the time interval $t_1$ refers to an interval between the starting point of input cycles of the current with the third frequency per input and the starting point of input cycles when the current with the third frequency is inputted next time.

In the example shown in FIG. 18, the input cycles of the current with the first frequency are 0.5 cycles per input, the input cycles of the current with the second frequency are 10 cycles per input and the input cycles of the current with the third frequency are 0.5 cycles per input. However, the current with the second frequency is temporarily inputted for 20 cycles only when the current with the third frequency is inputted. The current with the third frequency interrupts so as equally to divide the input cycles of the current with the second frequency into half.

As described above, by inputting the current with the first frequency selected from the range of 20 Hz to 200 Hz for cycles in the range of 0.5 cycles to 10 cycles per input, the growth of the protrusions 23 of the electrodes 19 is facilitated. Thereafter, by inputting the current with the second frequency selected from the range of 300 Hz to 1000 Hz for cycles in the range of 2 cycles to 200 cycles per input, the growth of the protrusions 23 of the electrodes 19 is moderately retarded. And by switching them alternately, in other words, by performing modulation, the balance between the facilitation and retardation of growth of the protrusions 23 is maintained properly and the shape of the protrusions 23 can be maintained for a long time.

By the way, during an initial stage of the cumulative lighting time (e.g., within 500 hours), the halogen cycle effect actively functions. Thus, in this stage, when the ambient temperature of the high-pressure mercury-vapor lamp 4 changes due to an environmental change of some kind, the protrusions 23 grow excessively, causing the distance between the electrodes 19 to be smaller than a desired range. As a result, the lamp voltage may fall into the low voltage state frequently or for a long time.

For this problem, as described above, by inputting the current with the third frequency lower than the first frequency and selected from the range of 5 Hz to 150 Hz for predetermined cycles by interrupting the cycle of the current with the second frequency, where the current with the third frequency does not interrupt every time the cycle of the current with the second frequency is inputted but interrupts at predetermined time intervals, the input cycles of the current with the third frequency are in the range of 0.5 cycles to 150 cycles per input, and the time interval $t_1$ at which the current with the third frequency interrupts the currency with the second frequency is in the range of 130 s to 300 s, excessive growth of the protrusions 23 itself in the initial stage of the cumulative lighting time is to be suppressed.

That is, by inputting the current with the third frequency the temperature of the tips 22 of the electrodes 19 can be raised instantly while maintaining an adequate spacing. As a result, the tendency of the protrusions 23 to evaporate increases temporarily, in other words, the following relationship is established: (amount of accumulation of tungsten forming the protrusions 23)<(amount of evaporation of tungsten forming the protrusions 23). This causes partial evaporation of the protrusions 23, thereby retarding excessive growth of the protrusions 23. Thus, it is possible to prevent the lamp voltage from falling into the low voltage state frequently or for a long time in the initial stage of the cumulative lighting time. In this case, in order to bring about the partial evaporation of the protrusions 23 with certainty to retard the excessive growth, the third frequency is set to be lower than the first frequency by 5 Hz or more.

As for the current with the first frequency, when (1) its frequency is less than 20 Hz or cycles for which the current is inputted exceed 10 cycles per input, the following problem arises. That is, due to an intensification of a DC lighting property, anode heating occurs at the tips 22 of the electrodes 19 and the growth of the protrusions 23 is compromised as the temperature of the tips 22 increases more than necessary. This may cause deformation or disappearance by evaporation of the protrusions 23. On the other hand, when (2) its frequency exceeds 200 Hz or cycles for which the current is inputted are less than 0.5 cycles per input, the following problem arises. That is, contrarily to the above-described case, due to an excessive weakening of the DC lighting property, the growth of the protrusions 23 is compromised as the temperature of the tips 22 of the electrodes 19 does not increase sufficiently. This may cause deformation or disappearance by evaporation of the protrusions 23. Therefore, with regard to the current with the first frequency, its frequency is set within the range of 20 Hz to 200 Hz and its input cycles are set within the range of 0.5 cycles to 5 cycles per input.

As for the current with the second frequency, when (1) its frequency exceeds 1000 Hz or cycles for which the current is inputted exceed 200 cycles per input, the following problem arises. That is, due to an intensification of a high-frequency lighting property, the effect of ions of evaporated tungsten returning to the protrusions 23 of the electrodes 19 excessively weakens, in other words, the effect of retarding the growth of the protrusions 23 excessively intensifies, causing the ions of tungsten to accumulate on portions other than the tips 22 of the electrodes 19. This may cause deformation of the shape of the tips 22 as a whole. On the other hand, when (2) its frequency is less than 300 Hz or cycles for which the current is inputted are less than 2 cycles per input, the following problem arises. That is, due to an excessive weakening of the high-frequency lighting property, the effect of retarding the growth of the protrusions 23 of the electrodes 19 becomes unachievable and the growth of the protrusions 23 becomes excessive. This may cause an abnormal reduction in the distance between the electrodes. Therefore, with regard to the current with the second frequency, its frequency is set within the range of 300 Hz to 1000 Hz and its input cycles are set within the range of 2 cycles to 200 cycles per input.

As for the current with the third frequency, when (1) its frequency is less than 5 Hz, cycles for which the current is inputted exceed 150 cycles per input or the time interval $t_1$ at which the current interrupts the current with the second frequency is less than 130 s, the following problem arises. That is, since an instant increase in the temperature of the tips 22 of the electrodes 19 becomes excessive, not only the protrusions 23 but also the shape of the electrodes 19 as a whole may deform or disappear by evaporation. On the other hand, when (2) its frequency exceeds 150 Hz, cycles for which the current is inputted are less than 0.5 cycles per input or the time interval $t_1$ at which the current interrupts the current with the second frequency exceeds 300 s, the following problem arises. That is, the temperature of the tips 22 of the electrodes 19 becomes unable to be increased instantly, so that desired partial disappearance may not be caused. Therefore, with regard to the current with the third frequency its frequency is set within the range of 5 Hz to 150 Hz and its input cycles are set within the range of 0.5 cycles to 150 cycles per input.

Figure 19:
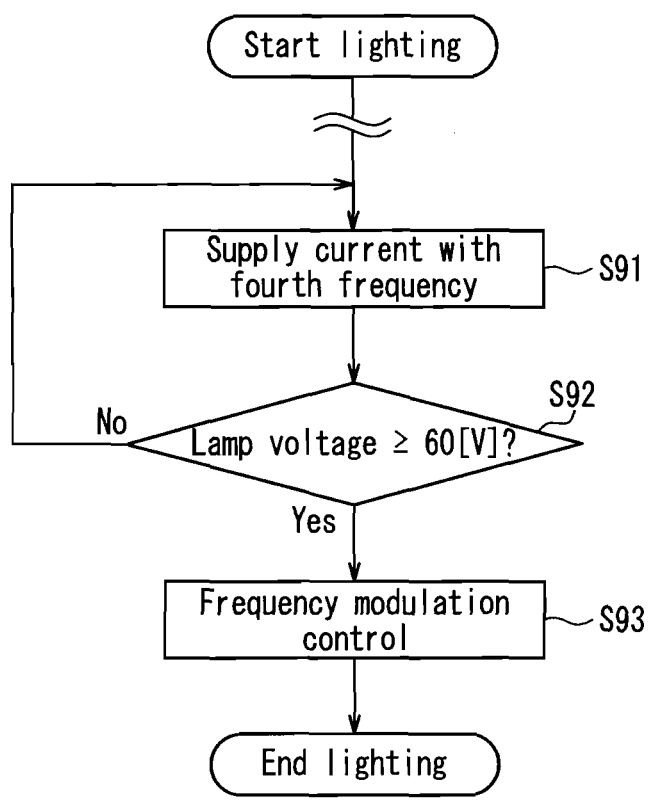
FIG. 19 is a flowchart showing a frequency control operation on an alternating current by a high-pressure discharge lamp lighting device included in Modified Example 5 of the high-pressure discharge lamp device.
Figure 20:
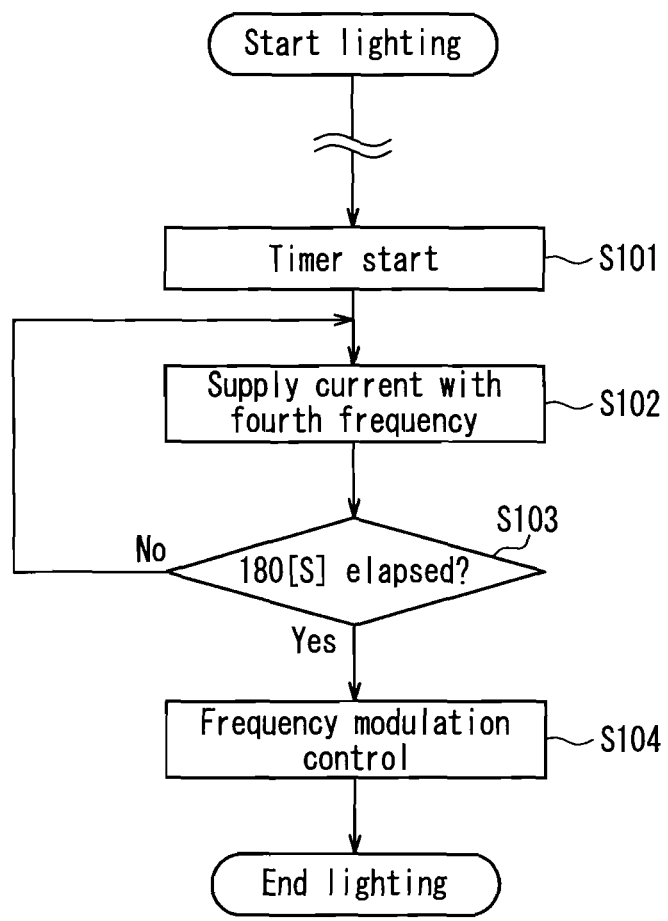
FIG. 20 is a flowchart showing a frequency control operation on an alternating current by a high-pressure discharge lamp lighting device included in Modified Example 6 of the high-pressure discharge lamp device.

Similarly to the high-pressure discharge lamp device according to Embodiment 1 described above, also in the high-pressure discharge lamp device according to the present embodiment, the certain period from the completion of the starting operation during which an alternating current with the fourth frequency (170 Hz) is supplied (modulation forbidden period) is not limited to "(a) from the completion of the starting operation until a predetermined time before lighting is shifted to the constant power lighting" described above. That is, as shown in FIG. 19, it may be "(b) from the completion of the starting operation until lighting is shifted to the constant power lighting". Or, as shown in FIG. 20, it may be "(c) from the completion of the starting operation until a predetermined time after lighting has been shifted to the constant power lighting". The details of these modified examples are as follows.

MODIFIED EXAMPLE 5

(3-2) Also in the operation example shown in FIG. 19, a transition to the low-frequency operation takes place after the completion of the starting operation described in the sections (1) and (2) above. The operation circuit 10 performs the constant current control (e.g., 3 A constant) until the lamp voltage rises and reaches a predetermined voltage (e.g., 60 V) along with evaporation of mercury. In the meantime, an alternating current with a frequency is fixed to the fourth frequency selected from the range of 50 Hz to 200 Hz, for example, fixed to 170 Hz, is supplied to the high-pressure mercury-vapor lamp 4 (step S91).

(4-2) When the lamp voltage rises to a predetermined value (e.g., 60V) after the completion of the starting operation (step S92: YES), an alternating current to be supplied is switched from an alternating current with the fourth frequency (170 Hz) to an alternating current subjected to the frequency modulation control at the same time as a transition to the constant power control for keeping the lamp power constant takes place (step S93). Thereafter, that alternating current continues to be supplied until the light is turned off (lighting switch OFF).

Similarly to the above-mentioned case, in the alternating current, currents with the first frequency and the second frequency are switched every time each current is inputted for predetermined cycles and a current with the third frequency is inputted for predetermined cycles by interrupting the cycle of current with the second frequency. The first frequency is selected from the range of 20 Hz to 200 Hz, the second frequency is selected from the range of 300 Hz to 1000 Hz, and the third frequency is lower than the first frequency and is selected from the range of 5 Hz to 150 Hz. The current with the third frequency does not interrupt every time the cycle of current with the second frequency is inputted. Rather, it is set to interrupt at predetermined intervals.

As for the current with the first frequency, its input cycles are in the range of 0.5 cycles to 10 cycles per input. As for the current with the second frequency, its input cycles are in the range of 2 cycles to 200 cycles per input. Further, as for the current with the third frequency, its input cycles are in the range of 0.5 cycles to 150 cycles per input. The time interval $t_1$ at which the current with the third frequency interrupts the current with the second frequency is in the range of 130 s to 300 s.

MODIFIED EXAMPLE 6

(3-3) Also in the operation example shown in FIG. 20, a transition to the low-frequency operation takes place after the completion of the starting operation described in the sections (1) and (2) above. The operation circuit 10 performs the constant current control (e.g., 3 A constant) until the lamp voltage rises and reaches a predetermined voltage (e.g., 60 V) along with evaporation of mercury. Meanwhile, the lighting discrimination circuit 13 performs "lighting detection" based on a lamp current detection signal from the lamp current detector 8 and determines whether it is "after the completion of the starting operation" or not. And as shown in FIG. 20, the timer 14 starts a count at the same time as the transition to the low-frequency operation takes place (step S101) and an alternating current with a frequency fixed to the fourth frequency selected from the range of 50 Hz to 200 Hz, for example, fixed to 170 Hz, is supplied to the high-pressure mercury-vapor lamp 4 (step S102).

Here, the timer setting time of the timer 14 is set to 180 s, for example. Unless the time counted by the timer elapses 180 s, an alternating current with the fourth frequency (170 Hz) is kept being supplied (step S103: NO). The timer setting time of 180 s is set to a time from the completion of the starting operation (cold start) until a predetermined time after lighting has been shifted to constant power (180 W) lighting. Also in this example, when the timer setting time is set to "from the completion of the starting operation until a predetermined time after lighting has been shifted to the constant power lighting", the "predetermined time" is preferably not too long in terms of properly growing and maintaining the protrusions 23 of the electrodes 19. For example, the upper limit is preferably 300 s or less from the completion of the starting operation.

(4-3) When the count by the timer 14 elapses 180 s (step S103: YES), an alternating current to be supplied is switched from an alternating current with the fourth frequency (170 Hz) to an alternating current subjected to the frequency modulation control (step S104). Thereafter, the alternating current continues to be supplied until the light is turned off (lighting switch OFF).

Similarly to the above-mentioned case, with regard to the alternating current, currents with the first frequency and the second frequency are switched every time each current is inputted for predetermined cycles and a current with the third frequency is inputted for predetermined cycles by interrupting the cycle of current with the second frequency. The first frequency is selected from the range of 20 Hz to 200 Hz, the second frequency is selected from the range of 300 Hz to 1000 Hz, and the third frequency is lower than the first frequency and is selected from the range of 5 Hz to 150 Hz. The current with the third frequency does not interrupt every time the cycle of the current with the second frequency is inputted. Rather, it interrupts at predetermined intervals.

And as for the current with the first frequency, its input cycles are in the range of 0.5 cycles to 10 cycles per input. As for the current with the second frequency its input cycles are in the range of 2 cycles to 200 cycles per input. Further, as for the current with the third frequency, its input cycles are in the range of 0.5 cycles to 150 cycles per input. The time interval $t_1$ at which the current with the third frequency interrupts the current with the second frequency is in the range of 130 s to 300 s.

However, when the lamp voltage rises and reaches a predetermined voltage value (e.g., 60 V), a transition to the constant power control for keeping the lamp power constant (180 W) takes place regardless of the count by the timer 14.

The high-pressure discharge lamp device according to Embodiment 4 of the present invention includes the high-pressure discharge lamp lighting device having the features as described above. Thus, it can exert the following effects.

That is, during the modulation forbidden period defined as a period (a) from the completion of the starting operation until a predetermined time before lighting is shifted to the constant power lighting, (b) from the completion of the starting operation until lighting is shifted to the constant power lighting or (c) from the completion of the starting operation until a predetermined time after lighting has been shifted to the constant power lighting, the frequency modulation control on an alternating current, which is performed for properly growing and maintaining the protrusions 23 of the electrodes 19 and preventing the formation of unnecessary protrusions, is not performed and a current with the fourth frequency selected from the range of 50 Hz to 200 Hz is supplied. Thus, the production of extremely harsh noise can be suppressed.

Therefore, the quietness can be improved sufficiently. Besides, the frequency modulation control on an alternating current during this period does not particularly contribute to control on the protrusions 23. Thus, there is no adverse impact on the effect that the protrusions 23 produce. And by performing the frequency modulation control on an alternating current after a lapse of these certain periods, the protrusions 23 can be grown and maintained properly. As a result, the occurrence of flicker caused by movements of the arc cathode spots can be prevented and a decrease in emitted light from the reflection mirror 26 due to the arc deviating from an initial position can also be suppressed.

By the way, according to the above-described features, although it is possible to curb the frequency or time of occurrence of the low voltage state where the lamp voltage falls below a desired lamp voltage, for example, 57V during stable lighting, the curbing may not be perfect. Therefore, when actually designing the device, the device needs to be designed with consideration given to a case of falling into the low voltage state on rare occasion. In case the protrusions 23 of the electrodes 19 grow excessively and the low voltage state occurs, an excessive lamp current flows when desired power is inputted to the high-pressure mercury-vapor lamp 4. As a result, the electrodes of the high-pressure mercury-vapor lamp 4 wear out, which could lead to a burst of the high-pressure mercury-vapor lamp 4 itself in some cases. Thus, the desired power cannot be inputted to the high-pressure mercury-vapor lamp 4 in the low voltage state, thereby causing problems such as a drop in brightness.

As a countermeasure to this, it is preferable to provide, when actually designing the device, the device with the function of stopping the frequency modulation control on the alternating current in case the lamp voltage falls below a certain value. In case the frequency modulation control on the alternating current is stopped, it is preferable to supply a current with a fifth frequency selected from the range of 300 Hz to 1000 Hz and higher than the second frequency at least by 10 Hz or more, for example, fixed to 390 Hz. As a result, the growth of the protrusions 23 of the electrodes 19 can be retarded.

(Embodiment 5)

Next, a projector according to Embodiment 5 of the present invention will be described with reference to FIGS. 21 and 22.

Figure 21:
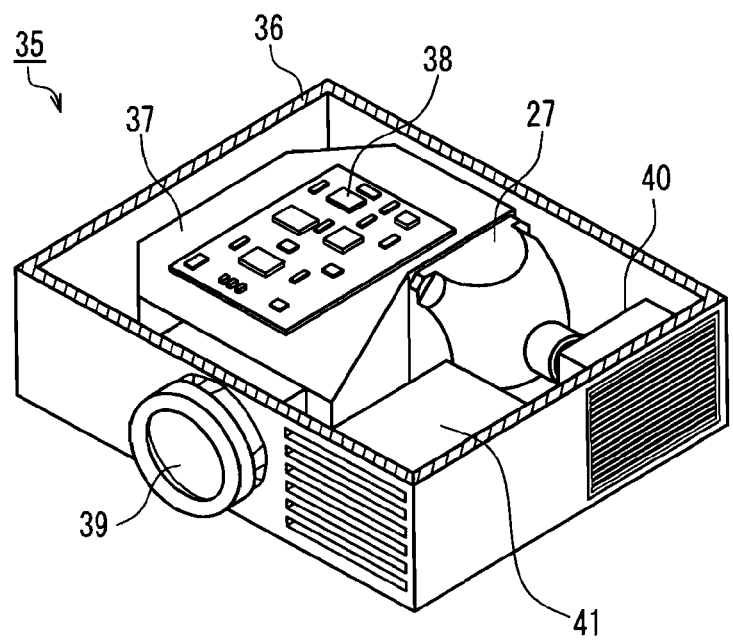
FIG. 21 is a partially sectional perspective view showing a configuration of a front projector as an example of a projector according to Embodiment 5 of the present invention.

FIG. 21 shows a general configuration of a front projector 35 as an example of the projector using one of the high-pressure discharge lamp devices according to the embodiments of the present invention. As the high-pressure discharge lamp device, the use of any of the high-pressure discharge lamp devices according to Embodiments 1 to 5 can result in similar effects. The front projector 35 is a type of projector that projects an image onto a screen (not shown) placed forward of the projector. Note that FIG. 21 shows a state in which the top of a housing 36 (described later) has been removed.

The front projector 35 is composed of the lamp unit 27 as a light source, an optical unit 37, a control unit 38, a projection lens 39, a cooling fan unit 40, a power supply unit 41 and the like, all of which are housed in the housing 36. The optical unit 37 includes an image forming unit for forming an image by modulating incident light and an illumination unit for illuminating the image forming unit with illumination light from the lamp unit 27 (none of them is shown). The illumination unit includes, for example, a color wheel (not shown) composed of color filters of three colors. The illumination unit separates illumination light into three primary colors and irradiates the image forming unit with the separated illumination light. The control unit 38 drives and controls the image forming unit, etc. The projection lens 39 magnifies and projects an optical image formed by being modulated by the image forming unit. The power supply unit 41 includes the high-pressure discharge lamp lighting device 3 described above, converts power supplied from a commercial power supply to power suited for the control unit 38 and the lamp unit 27 and supplies the power to each unit.

Figure 22:
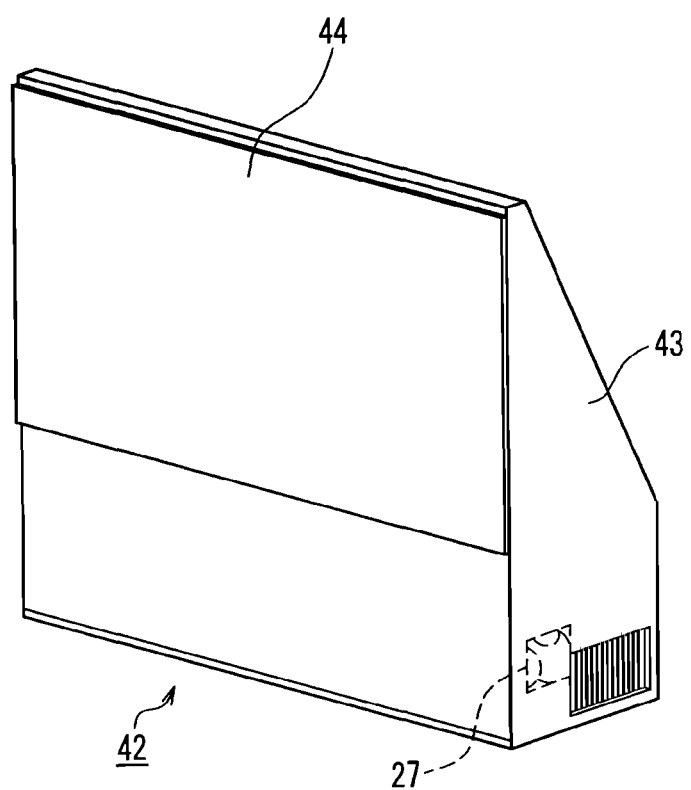
FIG. 22 is a perspective view showing a configuration of a rear projector as another example of the projector.

Further, any of the high-pressure discharge lamp devices according to Embodiments 1 to 5 can also be used as the light source of a rear projector 42 as an example of projection-type image display device shown in FIG. 22. The rear projector 42 includes the lamp unit 27, an optical unit, a projection lens, mirrors, the high-pressure discharge lamp lighting device and the like (none of them is shown), all of which are housed in a housing 43. An image projected by the projection lens and reflected on the mirrors is displayed by being projected from the back of a translucent screen 44.

According to the configurations of the projector according to Embodiment 5 of the present invention as described above, it is possible to achieve a projector that produces less noise.

In Embodiments 1 to 3, although a combination of two different frequencies, the first and second frequencies, has been used in performing the frequency modulation control on an alternating current, the number of different frequencies is not limited to two. Effects similar to the above-mentioned can be achieved by performing the modulation control with three or more different frequencies.

In each of the embodiments described above, the high-pressure mercury-vapor lamp 4 with constant power of 180 W has been used as the high-pressure mercury-vapor lamp. However, the high-pressure mercury-vapor lamp is not limited to this type and effects similar to the above-mentioned can be achieved by using, for example, a high-pressure mercury lamp in the range of 80 W to 1000 W. In that case, the lamp current value during the constant current control is not limited to 3 A and is determined in a variety of ways according to the design of the high-pressure mercury-vapor lamp. Further, the lamp voltage used to shift control to the constant power control is not 60V as described above and is determined according to the lamp current and constant power values during the constant current control in various case.

In each of the embodiments described above, the high-pressure mercury-vapor lamp 4 has been used specifically as the high-pressure discharge lamp. However, a lamp that can be used is not limited to a high-pressure mercury-vapor lamp and effects similar to the above-mentioned can be achieved by using a known shoot-arc metal halide lamp or the like.

Recently, some high-pressure discharge lamp devices of this type are provided with a dimming function for changing the lamp power gradually according to the size of space in which they are used. That is, in a normal mode, the constant power control is performed by keeping the lamp power constant (e.g., 180 W) but in a dimming mode, the constant power control is performed by changing the lamp power to 100 W and keeping it constant. When the high-pressure discharge lamp device according to each of the embodiments is provided with such a dimming function, the "constant power" described above refers to normal-mode constant power when the normal mode is set and to dimming-mode constant power when the dimming mode is set. ps Industrial Applicability According to the present invention, it is possible to improve the quietness while performing the frequency modulation control on an alternating current for properly growing and maintaining the protrusions of the electrodes. Thus, it is useful, for a high-pressure discharge lamp lighting device used in a projector, etc.

The invention claimed is:

1. A high-pressure discharge lamp lighting device for lighting, by supplying an alternating current, a high-pressure discharge lamp provided with an arc tube filled with a halogen material and including electrodes disposed therein with protrusions being formed on tips of the electrodes, the lighting device comprising:
a DC/DC converter that converts a direct voltage supplied from a DC power supply circuit to a direct current;
a DC/AC inverter that controls the direct current supplied from the DC/DC converter so as to generate and supply an alternating voltage and alternating current at a predetermined frequency to a high-pressure discharge lamp;
a high voltage generator that generates a high voltage for causing a start of the high-pressure discharge lamp;
a lamp current detector that detects a lamp current;
a lamp voltage detector that detects a lamp voltage; and
a control circuit that controls the DC/DC converter and the DC/AC inverter based on output signals of the lamp current detector and the lamp voltage detector,
wherein the lighting device controls so that constant current control is performed first after completion of a starting operation performed at a beginning of lighting and then the lighting is shifted to constant power lighting,
the control circuit is configured so as to control an operation such that, except during a modulation forbidden period set as a certain period from the completion of the starting operation, a frequency of the alternating current is subjected to frequency modulation control for being changed alternately between at least a first frequency and a second frequency having higher audibility than the first frequency, in which the higher audibility is determined based on a relationship between loudness and frequency, and during the modulation forbidden period defined as a period
(a) from the completion of the starting operation until a predetermined time before the lighting is shifted to the constant power lighting,
(b) from the completion of the starting operation until the lighting is shifted to the constant power lighting, or
(c) from the completion of the starting operation until a predetermined time after the lighting has been shifted to the constant power lighting,
the frequency modulation control is not performed after an alternating current with a third frequency lower than the second frequency is supplied.

2. A high-pressure discharge lamp lighting device for lighting, by supplying an alternating current, a high-pressure discharge lamp provided with an arc tube filled with a halogen material and including electrodes disposed therein with protrusions being formed on tips of the electrodes, the lighting device comprising:
a DC/DC converter that converts a direct voltage supplied from a DC power supply circuit to a direct current;
a DC/AC inverter that controls the direct current supplied from the DC/DC converter so as to generate and supply an alternating voltage and alternating current at a predetermined frequency to a high-pressure discharge lamp;
a high voltage generator that generates a high voltage for causing a start of the high-pressure discharge lamp;
a lamp current detector that detects a lamp current;
a lamp voltage detector that detects a lamp voltage; and
a control circuit that controls the DC/DC converter and the DC/AC inverter based on output signals of the lamp current detector and the lamp voltage detector,
wherein the lighting device controls so that constant current control is performed first after completion of a starting operation performed at a beginning of lighting and then the lighting is shifted to constant power lighting,
the control circuit is configured so as to control an operation such that, except during a modulation forbidden period set as a certain period from the completion of the starting operation, a frequency of the alternating current is subjected to frequency modulation control for being changed alternately between at least a first frequency and a second frequency having higher audibility than the first frequency, in which the higher audibility is determined based on a relationship between loudness and frequency, and
the modulation forbidden period is defined in a range of 60 s to 300 s which begins from the completion of the starting operation, and during the modulation forbidden period the frequency modulation control is not performed after an alternating current with a third frequency lower than the second frequency is supplied.

3. The high-pressure discharge lamp lighting device according to claim 1 or 2, wherein the third frequency is selected from a range of 50 Hz to 200 Hz.

4. The high-pressure discharge lamp lighting device according to claim 1 or 2, wherein the second frequency is selected from a range of 300 Hz to 1000 Hz.

5. The high-pressure discharge lamp lighting device according to claim 1 or 2, wherein when a lamp voltage of the high-pressure discharge lamp falls below a certain value after a lapse of the modulation forbidden period, the frequency modulation control is stopped and an alternating current with a fourth frequency selected from a range of 300 Hz to 1000 Hz is supplied.

6. The high-pressure discharge lamp lighting device according to claim 5, wherein the fourth frequency is set to be higher than the second frequency by 10 Hz or more.

7. A high-pressure discharge lamp device comprising:
a high-pressure discharge lamp provided with an arc tube filled with a halogen material and including electrodes disposed therein, protrusions being formed on tips of the electrodes, and
the high-pressure discharge lamp lighting device according to claim 1 or 2 for lighting the high-pressure discharge lamp.

8. A projector comprising:
the high-pressure discharge lamp device according to claim 7;
an optical unit for forming an optical image by modulating illumination light from the high-pressure discharge lamp device; and
a projection lens for magnifying and projecting the optical image.

9. A high-pressure discharge lamp lighting device for lighting, by supplying an alternating current, a high-pressure discharge lamp provided with an arc tube filled with a halogen material and including electrodes disposed therein with protrusions being formed on tips of the electrodes,
the lighting device comprising:
a DC/DC converter that converts a direct voltage supplied from a DC power supply circuit to a direct current;
a DC/AC inverter that controls the direct current supplied from the DC/DC converter so as to generate and supply an alternating voltage and alternating current at a predetermined frequency to a high-pressure discharge lamp;
a high voltage generator that generates a high voltage for causing a start of the high-pressure discharge lamp;
a lamp current detector that detects a lamp current:,
a lamp voltage detector that detects a lamp voltage; and
a control circuit that controls the DC/DC converter and the DC/AC inverter based on output signals of the lamp current detector and the lamp voltage detector,
wherein the lighting device controls so that constant current control is performed first after completion of a starting operation performed at a beginning of lighting and then the lighting is shifted to constant power lighting,
the control circuit is configured so as to control an operation such that, except during a modulation forbidden period set as a certain period from the completion of the starting operation, a frequency of the alternating current is subjected to frequency modulation control for being changed alternately between a first frequency selected from a range of 20 Hz to 200 Hz and a second frequency selected from a range of 300 Hz to 1000 Hz, while inputting an alternating current with a third frequency lower than the first frequency and selected from a range of 5 Hz to 150 Hz by interrupting the alternating current with the second frequency,
input cycles of the alternating current with the first frequency are in a range of 0.5 cycles to 10 cycles per input, input cycles of the alternating current with the second frequency are in a range of 2 cycles to 200 cycles per input, input cycles of the alternating current with the third frequency are in a range of 0.5 cycles to 150 cycles per input, and a time interval at which the alternating current with the third frequency is inputted by interrupting the alternating current with the second frequency is in a range of 130 s to 300 s, and during the modulation forbidden period defined as a period
(a) from the completion of the starting operation until a predetermined time before the lighting is shifted to the constant power lighting,
(b) from the completion of the starting operation until the lighting is shifted to the constant power lighting, or
(c) from the completion of the starting operation until a predetermined time after the lighting has been shifted to the constant power lighting,
the frequency modulation control is not performed after an alternating current with a fourth frequency selected from a range of 50 Hz to 200 Hz is supplied.

10. The high-pressure discharge lamp lighting device according to claim 9, wherein the third frequency is set to be lower than the first frequency by 5 Hz or more.

11. The high-pressure discharge lamp lighting device according to claim 9 or 10, wherein when a lamp voltage of the high-pressure discharge lamp falls below a certain value after a lapse of the modulation forbidden period, an alternating current with a fifth frequency selected from a range of 300 Hz to 1000 Hz is supplied.

12. The high-pressure discharge lamp lighting device according to claim 11, wherein the fifth frequency is set to be higher than the second frequency by 10 Hz or more.

13. A high-pressure discharge lamp lighting method for lighting, by supplying an alternating current, a high-pressure discharge lamp provided with an arc tube filled with a halogen material and including electrodes disposed therein with protrusions being formed on tips of the electrodes, in the lighting method, constant current control is performed first after completion of a starting operation performed at a beginning of lighting and then the lighting is shifted to constant power lighting,
wherein, except during a modulation forbidden period set as a certain period from the completion of the starting operation, a frequency of the alternating current is subjected to frequency modulation control for being changed alternately between at least a first frequency and a second frequency having higher audibility than the first frequency, in which the higher audibility is determined based on a relationship between loudness and frequency, and
during the modulation forbidden period defined as a period
(a) from the completion of the starting operation until a predetermined time before the lighting is shifted to the constant power lighting,
(b) from the completion of the starting operation until the lighting is shifted to the constant power lighting, or
(c) from the completion of the starting operation until a predetermined time after the lighting has been shifted to the constant power lighting,
the frequency modulation control is not performed after an alternating current with a third frequency lower than the second frequency is supplied.

14. A high-pressure discharge lamp lighting method for lighting, by supplying an alternating current, a high-pressure discharge lamp provided with an arc tube filled with a halogen material and including electrodes disposed therein with protrusions being formed on tips of the electrodes, in the lighting method, constant current control is performed first after completion of a starting operation performed at a beginning of lighting and then the lighting is shifted to constant power lighting, wherein, except during a modulation forbidden period set as a certain period from the completion of the starting operation, a frequency of the alternating current is subjected to frequency modulation control for being changed alternately between at least a first frequency and a second frequency having higher audibility than the first frequency, in which the higher audibility is determined based on a relationship between loudness and frequency, and the modulation forbidden period is defined in a range of 60 s to 300 s which begins from the completion of the starting operation, and during the modulation forbidden period the frequency modulation control is not performed after an alternating current with a third frequency lower than the second frequency is supplied.

15. The high-pressure discharge lamp lighting method according to claim 13 or 14, wherein the third frequency is selected from a range of 50 Hz to 200 Hz.

16. The high-pressure discharge lamp lighting method according to claim 13 or 14, wherein the second frequency is selected from a range of 300 Hz to 1000 Hz.

17. The high-pressure discharge lamp lighting method according to claim 13 or 14, wherein when a lamp voltage of the high-pressure discharge lamp falls below a certain value after a lapse of the modulation forbidden period, the frequency modulation control is stopped and an alternating current with a fourth frequency selected from a range of 300 Hz to 1000 Hz is supplied.

18. The high-pressure discharge lamp lighting method according to claim 17, wherein the fourth frequency is set to be higher than the second frequency by 10 Hz or more.

19. A high-pressure discharge lamp lighting method for lighting, by supplying an alternating current, a high-pressure discharge lamp provided with an arc tube filled with a halogen material and including electrodes disposed therein with protrusions being formed on tips of the electrodes, in the lighting method, constant current control is performed first after completion of a starting operation performed at a beginning of lighting and then the lighting is shifted to constant power lighting, wherein, except during a modulation forbidden period set as a certain period from the completion of the starting operation, a frequency of the alternating current is subjected to frequency modulation control for being changed alternately between a first frequency selected from a range of 20 Hz to 200 Hz and a second frequency selected from a range of 300 Hz to 1000 Hz, while inputting an alternating current with a third frequency lower than the first frequency and selected from a range of 5 Hz to 150 Hz by interrupting the alternating current with the second frequency, input cycles of the alternating current with the first frequency are in a range of 0.5 cycles to 10 cycles per input, input cycles of the alternating current with the second frequency are in a range of 2 cycles to 200 cycles per input, input cycles of the alternating current with the third frequency are in a range of 0.5 cycles to 150 cycles per input, and a time interval at which the alternating current with the third frequency is inputted by interrupting the alternating current with the second frequency is in a range of 130 s to 300 s, and during the modulation forbidden period defined as a period
(a) from the completion of the starting operation until a predetermined time before the lighting is shifted to the constant power lighting,
(b) from the completion of the starting operation until the lighting is shifted to the constant power lighting, or
(c) from the completion of the starting operation until a predetermined time after the lighting has been shifted to the constant power lighting, the frequency modulation control is not performed after an alternating current with a fourth frequency selected from a range of 50 Hz to 200 Hz is supplied.

20. The high-pressure discharge lamp lighting method according to claim 19, wherein the third frequency is set to be lower than the first frequency by 5 Hz or more.

21. The high-pressure discharge lamp lighting method according to claim 19 or 20, wherein when a lamp voltage of the high-pressure discharge lamp falls below a certain value after a lapse of the modulation forbidden period, an alternating current with a fifth frequency selected from a range of 300 Hz to 1000 Hz is supplied.

22. The high-pressure discharge lamp lighting method according to claim 21, wherein the fifth frequency is set to be higher than the second frequency by 10 Hz or more.

* * * * *